(12) United States Patent
Kojima

(10) Patent No.: US 7,104,652 B2
(45) Date of Patent: Sep. 12, 2006

(54) IMAGE DISPLAY DEVICE AND PROJECTOR

(75) Inventor: Hideki Kojima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/639,472

(22) Filed: Aug. 13, 2003

(65) Prior Publication Data

US 2004/0080718 A1    Apr. 29, 2004

(30) Foreign Application Priority Data

Aug. 20, 2002 (JP) .............................. 2002-239559
Jun. 16, 2003 (JP) .............................. 2003-170698

(51) Int. Cl.
*G03B 21/00* (2006.01)
*G03B 21/14* (2006.01)
*G03B 21/20* (2006.01)
*G03B 21/28* (2006.01)
*G02B 26/08* (2006.01)
*G02F 1/1335* (2006.01)
*G02F 1/00* (2006.01)

(52) U.S. Cl. ........................... 353/33; 353/34; 353/37; 353/81; 353/82; 353/84; 353/99; 353/102; 359/204; 359/211; 359/216; 349/5; 349/8; 348/750; 348/757; 348/759

(58) Field of Classification Search .................. 353/20, 353/31, 34, 37, 30, 33, 35, 98, 99, 32, 81, 353/82, 84, 102; 359/487, 247, 246, 618, 359/495, 497, 250, 251, 253, 256, 237, 204, 359/211, 216, 629, 638; 362/331, 19, 308; 349/5, 8, 9; 348/744, 750, 751, 757, 759, 348/771

See application file for complete search history.

(56) References Cited

U.S. PATENT DOCUMENTS 5,404,175 A * 4/1995 Nagae et al. ................ 348/751

(Continued)

FOREIGN PATENT DOCUMENTS

CA    2 421 854 A1    3/2002

(Continued)

OTHER PUBLICATIONS

Shimizu, "Single panel reflective LCD projector", part of the IS&T/SPIE Conference on Projection Displays V, San José, California, Jan. 1999, *SPIE*, vol. 3634, pp. 197-206.

(Continued)

*Primary Examiner*—W. B. Perkey
*Assistant Examiner*—Rochelle Blackman
(74) *Attorney, Agent, or Firm*—Oliff & Berridge, PLC

(57) ABSTRACT

To provide an image display device and a projector having a brightness or an excellent utilization efficiency of the light by improving the display performance of a moving picture. A projector includes a light source for emitting illumination light, a liquid crystal light valve serving as a spatial light modulator having an image-forming area for forming image light by modulating the illumination light based on an electrical signal, a pair of fly-eye lenses and serving as an irradiation optical system for converting at least one of the shape and the size of the light beam of the illumination light emitted from the light source and for irradiating the converted illumination light on a region which is smaller than the image-forming area, a superposing lens, a rotating prism serving as an illumination-light scanning optical system for scanning the illumination light irradiated by the irradiation optical system on the image-forming area, and a projection lens as a projection device for projecting the image light modulated by the liquid crystal light valve.

15 Claims, 21 Drawing Sheets

U.S. PATENT DOCUMENTS

| | | | |
|---|---|---|---|
| 5,428,467 A | 6/1995 | Schmidt | 359/40 |
| 5,642,129 A | 6/1997 | Zavracky et al. | 345/100 |
| 5,850,307 A * | 12/1998 | Straayer | 359/209 |
| 6,109,752 A * | 8/2000 | Itoh et al. | 353/98 |
| 6,226,055 B1 | 5/2001 | Koba | 349/5 |
| 6,457,833 B1 * | 10/2002 | Ishikawa et al. | 353/99 |
| 6,493,149 B1 * | 12/2002 | Ouchi | 359/634 |
| 6,511,183 B1 | 1/2003 | Shimizu et al. | 353/20 |
| 6,511,186 B1 * | 1/2003 | Burstyn et al. | 353/76 |
| 6,827,450 B1 * | 12/2004 | McGettigan et al. | 353/31 |
| 2002/0191154 A1 * | 12/2002 | Shahzad et al. | 353/20 |
| 2003/0231262 A1 * | 12/2003 | Janssen | 349/5 |

FOREIGN PATENT DOCUMENTS

| | | |
|---|---|---|
| EP | 1 220 011 A2 | 7/2002 |
| JP | A-8-304739 | 11/1996 |
| JP | 9-325715 A | 12/1997 |
| JP | A-2000-275604 | 10/2000 |
| JP | A-2001-296841 | 10/2001 |
| JP | A-2002-6766 | 1/2002 |
| KR | A-2000-0045643 | 7/2000 |
| KR | A-2002-0004766 | 1/2002 |
| WO | WO 03/083573 A1 | 10/2003 |

OTHER PUBLICATIONS

Janssen, "A novel single light valve hight brightness HD color projector", Philips laboratories, Briarcliff, USA, pp. 249-252.

Shimizu, "Single Panel Reflective LCD Optics", *IDW '99*, pp. 989-992.

Shimizu, "Invited Paper: Scrolling Color LCOS for HDTV Rear Projection", *SID 01 DIGEST*, pp. 1072-1075.

Brennesholtz, "Color-Sequential LCoS Projector with a Rotating Drum", *SID 02 DIGEST*, pp. 1346-1349.

Arai et al., "A New Projection System with Scrolling Illumination for Motion Picture", *SID 03 DIGEST*, pp. 770-773.

English Translation of JP 2004-004619 dated Jan. 8, 2004 in Japan.

Jeffrey A. Shimizu, "Single Panel Reflective LCD Projector," Projection Displays V, Proceeding SPIE, vol. 3634, pp. 197-206, 1999.

* cited by examiner

IMAGE DISPLAY DEVICE AND PROJECTOR

BACKGROUND OF THE INVENTION

1. Field of Invention

The present invention relates to an image display device and a projector. More particularly, it relates to a projector to illuminate a spatial light modulator, such as a liquid crystal light valve or a tilting mirror device with illumination light emitted from a light source, and to display an image by projecting the illumination light from a projection lens onto a screen or the like by causing the illumination light modulated by the spatial light modulator to impinge on a projection lens. Specifically, this technology is useful in displaying moving pictures.

2. Description of Related Art

FIG. 18 shows a conceptual schematic illustrating a related art projector. This projector 1000 is provided with a light source 110, a pair of fly-eye lenses 1021 and 1022, a superposing lens 1023, a collimating lens 140, a light valve 151, and a projection lens 160.

The fly-eye lenses 1021 and 1022 are lens arrays in which micro lenses having a rectangular form are arranged in the form of matrix. The external shape of each of the micro lenses is substantially similar to the external shape of the image-forming area of the light valve 151, serving as a spatial light modulator, when each of the micro lenses is viewed along the optical axis direction. For example, if the external shape of the image-forming area of the light valve 151 is a rectangular shape having an aspect ratio of 4:3, the external shape of each of the micro lenses also has a rectangular shape having an aspect ratio of 4:3.

The fly eye lens 1021 divides the illumination light emitted from the light source 110 into a plurality of partial light beams and condenses each of the divided partial light beams on the micro lenses of the fly eye lens 1022, respectively. The fly eye lens 1022 emits each of the plurality of divided partial light beams, and causes each of the emitted plurality of divided partial light beams to impinge on the superposing lens 1023. Further, the superposing lens 1023 superposes the plurality of split partial light beams after passing through a collimating lens 140, and then illuminates the superposed light beams on the image-forming region of the light valve 151. At this time, since the aspect ratio of each of the external shapes of the micro lenses and the aspect ratio of the image-forming area of the light valve 151 are equal to each other, illumination light having a uniform luminance distribution over the whole image-forming area of the light valve 151 can be generated.

Therefore, the projector 1000 illuminates the image-forming area of the light valve 151 with the illumination light emitted from the light source 110 by making the distribution of the luminance uniform, and after the illumination light is modulated by the light valve 151, the illumination light is incident on the projection lens 160 serving as the projection device, and then is projected from the projection lens 160 onto a screen (not shown) as image light, thereby displaying an image having smaller brightness irregularity.

Further, there is a liquid crystal light valve in which a liquid crystal panel is used in a single light valve. The projector illuminates the liquid crystal light valve with the illumination light emitted from the light source, the illumination light is modulated by the liquid crystal light valve based on the image signal, and the display performance of the moving picture to be projected onto the screen by the projector is equal to the display performance of the moving picture based on the response performance of the liquid crystal light valve, since the illumination light is projected onto the screen after expanding the illumination light by the projection lens.

Further, in the related art image display device, a technique to improve the quality of the moving picture has been proposed by scanning the illumination area to be illuminated by the display element. In a certain image display device, a construction for scanning the illumination area to be illuminated by the display element by disposing a plurality of light sources on the rear surface of the display element and sequentially turning the light on and off at predetermined time intervals is well known (for example, refer to Japanese Unexamined Patent Application Publication No. 2000-275604). Further, in another related art image display device, a construction for scanning the illumination area to be illuminated by the display element by rotating a light condensing tube provided with a slit for defining the direction in which the light source emits light is well known (for example, refer to Japanese Unexamined Patent Application Publication No. 2002-6766).

SUMMARY OF THE INVENTION

Displays can be classified into an impulse type and a hold type in accordance with the difference between the displaying methods. The impulse type uses a method to display on each pixel light having a brightness required for momentary display. For example, a CRT [cathode-ray tube] is a well known impulse-type display. Further, the hold-type display uses a method to display on each pixel light having a brightness required for momentary display during a predetermined time period. For example, a liquid crystal display is a well known hold-type display. That is, a projector utilizing a liquid crystal light valve is also one type of hold-type display.

In general, the impulse-type display and the hold-type display have different display performances of the moving picture due to differences between the display methods. Hereinafter, the difference in display performance of the moving picture in the impulse-type display and the hold-type display is represented by the difference in visual performance as detected by the human eye. Therefore, the problems of the related art projector to be addressed by the invention are described below.

FIG. 19 shows a schematic for illustrating the display performance of the moving picture in the impulse-type display. FIG. 20 shows a schematic for illustrating display performance of the moving picture in the hold-type display. Further, in both figures, the moving distance of the moving picture is taken as a transverse axis and the time is taken as a longitudinal axis. Further, in the both figures, the thickness of the display object in the direction of the longitudinal axis represents the light emitting time. For example, if the thickness between one frame is 100%, the light beam has been emitted during all the time between one first frames, whereas if the thickness between one first frames is 50%, the light beam has been emitted during a half of the time between one frame.

As shown in FIG. 19, in the case of the impulse-type display, if the moving picture is moving in accordance with the passage of time on the screen, the end portion of the moving picture is somewhat faintly visible to the human eye. However, as shown in FIG. 20, in the case of the hold-type display, if the moving picture is moving in accordance with the passage of time on the screen, the end portion of the moving picture becomes more blurred than the end portion of the moving picture of the impulse-type display, to the human eye.

The reason that the hold-type display becomes more blurred than the impulse-type display is that the light beam is temporally emitted in the impulse-type display to thereby minimize an afterimage that remains in the brain by an integration and the light beam is continuously emitted during a predetermined time interval in the hold-type display to easily enlarge the afterimage that remains in the brain by the integration.

FIGS. 21 and 22 show schematics for illustrating methods for enhancing the display performance of the moving picture in the hold-type display. Further, since the methods for taking the longitudinal axis and the transverse axis and the definition of the thickness of the display object in the longitudinal direction are similar to those of FIG. 19 and FIG. 20, the description thereof is omitted.

For example, as shown in FIG. 21, if the change speed of the image is fast, the end portions of the moving picture are seen more clearly, thereby reducing the faintness. But, in case of the hold-type display utilizing a liquid crystal or the like, it is very difficult that the change speed of the image is performed very rapidly like this, since the response speed of the display object is relatively very slow. Further, it is required that the amount of the displaying image data is increased in accordance with the increased change speed of the image.

Further, FIG. 22 shows a method to display, like the impulse-type display, by controlling the lighting of the light. For example, if the impulse-type display is a liquid crystal display, the method turns on the lighting of the illumination light, such as a backlight intermittently and turns off the illumination light continuously by using a shutter. However, it is very difficult to perform an intermittent lighting since a high voltage of discharging lamp is commonly utilized as the light source in the projector. Further, if the shutter is utilized, there exists a problem that the brightness or the utilizing efficiency of the light is decreased since the illumination light is not used during the closed state of the shutter.

Hereinafter, the problems to be addressed in the related art image display device for enhancing the quality of the moving picture are described below. Referring to the construction of the Japanese Unexamined Patent Application Publication No. 2000-275604, since a plurality of light sources need to be disposed in a plane, there is a restriction that the lighting or the light out of the light source should be implemented instantaneously, or, that the illumination light sources should be placed in the plane uniformly. Of course, it is difficult to adapt them to the projector utilizing the high voltage of a discharge lamp. Further, since the light source to light out theoretically is required, there is a problem that the image is displayed darkly for the number of original light sources. Further, referring to the construction of Japanese Unexamined Patent Application Publication No. 2002-6766, it is difficult for the light beam, which does not pass through the slit directly, to be surely guided to irradiate on the display device, since the construction defines a region to illuminate while restricting the direction of the light beam to be emitted by diffusing in a plurality of directions from the light sources by rotating the condensing tube on which the slit is formed, without scanning the light beam itself emitted from the light source. As a result, it is impossible to increase an efficiency of the light.

Therefore, the present invention has been made in view of the above described problems. The present invention provides an image display device and a projector having excellent brightness or utilization efficiency of illumination light by improving the display performance of a moving picture.

In order to address the above described problems, according to a first exemplary embodiment of the present invention, there is provided an image display device including: a light source to emit illumination light; a spatial light modulator having an image-forming area to form image light by modulating the illumination light based on an electrical signal; an irradiation optical system to illuminate the illumination light onto a region narrower than the image-forming area by converting at least one of the shape and the size of the light beam of the illumination light emitted from the light source; and an illumination-light scanning optical system to scan the illumination light emitted by the illumination optical system on the image-forming area.

According to such a configuration, in the momentary time, although the illumination light illuminates only a portion of the image-forming area of the spatial light modulator by the irradiation optical system, since, in a certain range of time, the illumination light can be scanned on the image-forming area of the spatial light modulator by the illumination-light scanning optical system, the system is capable of implementing the illumination of the illumination light with a uniform luminance distribution over the overall image-forming area. As a result, if the viewer watches the image display device directly, the viewer can recognize the image by his eyes. Further, if the viewer keeps an eye on a part of the image-forming area, an effect equal to the intermittence lighting occurs since the illumination light is generated or is not generated, periodically. As a result, although the image display device employs the hold-type spatial light modulator, it can display a clear moving picture. Further, in the case when the amount of the light beam equal to that of the related art image display device is emitted from the light source, the present invention is capable of displaying the image onto the screen without becoming dark in comparison with the related art image display device, since the amount of the light beam does not change from that of the related art image display device. Accordingly, by improving the display performance of the moving picture, it is possible that a display device having excellent brightness or utilization efficiency of the illumination light is provided. Further, the present invention, since it has the structure that the light beam of the illumination light itself is scanned by the illumination light scanning optical system by illuminating the illumination light on the part of the image-forming area, is very different in the brightness or utilization efficiency of the illumination light from the related art image display device that has a construction for sequentially processing the lighting and lighting out of the plurality of the light sources in time difference or a construction for defining a region to illuminate while restricting the direction of the light to be emitted by diffusing, in a plurality of directions from the light sources, by rotating a condensing tube formed thereon a slit.

According to one aspect of the first exemplary embodiment of the present invention, it is preferable that the illumination-light scanning optical system be provided with a rotating prism to change the refractive angle of the illumination light, while rotating, to thus scan the illumination light. Thereby, the rotating prism is capable of scanning the light beam emitted from the irradiation optical system. As a result, it can be easily implemented that the illumination light is scanned on the image-forming area.

Further, in accordance with another aspect of the first exemplary embodiment of the present invention, it is preferable that the irradiation optical system include a lens array member to split the illumination light into a plurality of partial light beams to condense each of the divided partial light beam and a superposing lens unit to superpose the divided partial light beams on the image-forming area or a conjugate plane with respect to the image-forming area. According to this construction, it is possible that the irradiation optical system is easily realized to illuminate the illumination light on an area which is smaller than the image-forming area while matching the luminance distribution of the light source by changing the external shape of the lens array member or the condensing magnification of the superposing lens unit. Further, it is preferable that the illumination light be superimposed on the surface conjugated with the image-forming area. Further, the illumination light superimposed at the image-forming area is imaged by the relay imaging system. As a result, the present invention can achieve an effect similar to that obtained by superimposing the illumination light on the image-forming area. Further, it is preferable that the plane for superposing the illumination light be a neighboring plane of the image-forming area or a neighboring plane of a conjugate plane with respect to the image-forming area.

Further, in accordance with another preferable aspect of the first exemplary embodiment of the present invention, it is preferable that the illumination-light scanning optical system be provided with a rotating prism to change the refractive angle of the illumination light, while rotating, to thus scan the illumination light and at least one rotating prism be disposed between the superposing lens unit and the spatial light modulator. According to this construction, it is possible to easily realize a construction capable of scanning the illumination light on the image-forming area, since a construction in which the light beam, after passing through the superposing lens unit, is synthesized and then scanned by the rotating prism, is allowable.

Further, in accordance with still another aspect of the first exemplary embodiment of the present invention, it is preferable that the illumination-light scanning optical system be provided with a rotating prism to change the refractive angle of the illumination light, while rotating, to thus scan the illumination light and a plurality of the rotating prisms be arranged according to the partial light beam split by the lens array member. According to this construction, it is possible to realize a construction in which a relatively small sized rotating prism, matching with the size of the partial light beam, can be placed in the image display device compactly and the illumination light can be scanned on the image-forming area.

Further, in accordance with still another aspect of the first exemplary embodiment of the present invention, it is preferable that the irradiation optical system be provided with a rod part to reflect the illumination light inputted from an incident end by an inside wall or an outside wall to emit the reflected illumination light at an emission end and an imaging lens unit to form an image of the emission end on the image-forming area. According to this construction, by changing the combination of the shape of the emission ends of the rod part and the condensing magnification of the imaging lens unit, it is possible to realize an irradiation optical system to irradiate the illumination light on an area which is smaller than the image-forming area while matching the distribution of the illumination of the light source.

Further, in accordance with still another aspect of the first exemplary embodiment of the present invention, it is preferable that the illumination-light scanning optical system be provided with a rotating prism to change the refractive angle of the illumination light, while rotating, to thus scan the illumination light and at least one rotating prism be disposed between the rod part and the spatial light modulator. According to this construction, since the rotating prism can be placed and accommodated to the size of the illumination light emitted from the rod member, it is possible to easily realize the construction in which the illumination light can be scanned on the image-forming area, after the illumination light beam passes through the rotating prism emitted from the emission ends of the rod.

Further, in accordance with a second exemplary embodiment of the present invention, there are provided a projector, including the image display device described above and a projection device to project an image displayed on the image display device.

According to this construction, although the illumination light is illuminated only at a portion of the image-forming area of the spatial light modulator by the irradiation optical system in momentary time, since, in a certain range of time, the illumination light can be scanned on the image-forming area of the spatial light modulator by the illumination-light scanning optical system, the system is capable of implementing the illumination with a uniform luminance distribution over the overall image-forming area. As a result, if the image is projected onto the screen by the projection device, the viewer can recognize the image by his eyes. Further, if the viewer keeps an eye on a part of the image-forming area, the effect equal to the intermittence lighting occurs since the illumination light is generated or is not generated, periodically. As a result, although the image display device employs the hold-type spatial light modulator, it can display a clear moving picture. Further, in case the same amount of the light beam as that of the related art projector is emitted from the light source, the present invention is capable of displaying the image onto the screen without becoming dark in comparison with the related art image display device, since the amount of the light beam does not change from that of the related art projector. Accordingly, by improving the display performance of the moving picture, it is possible that a projector having good brightness or utilization efficiency of light is provided.

Further, in accordance with a preferred aspect of the second exemplary embodiment of the present invention, it is preferable that the image display device further include a color separation optical system to split the illumination light scanned by the illumination-light scanning optical system into illumination light with at least two colors. Thereby, the moving picture can be displayed in full color by providing at least one illumination-light scanning optical system.

Further, in accordance with another preferred aspect of the second exemplary embodiment of the present invention, it is preferable that the image display device further include a color separation optical system to split the illumination light scanned by the illumination-light scanning optical system into illumination light with at least two colors and a relay imaging device be disposed in an optical path of an illumination light having a larger optical path than the other illumination light among the illumination light separated in color by the color separation optical system. The relay imaging device transmits the image before the incidence and the image after the emission in the same direction. According to this construction, since the relay imaging device to transmit the light beams in the same directions of the images before the incidence of the light beam and after the emission of the light beam to each other is disposed, the inversion of the image does not occur as in the case where the lens is utilized simply. That is, although the relay imaging device is utilized, the effect of the inversion of the scanning direction of the image can be avoided. Therefore, in the image of the screen, the phenomenon that the scanning directions of each color are not uniformly provided by the relay imaging device is eliminated. As a result, since the construction is allowable in which a display such as intermittent lighting independently made by each of the colors separated in color is avoided, it is possible to reduce or prevent the flicker of the color which may be unpleasant to the human eye. At the same time, it is possible that the difference of the images between each of the colors due to the difference of the lengths between the optical paths is corrected by using the relay imaging device. Further, it is preferable that the relay imaging device be an optical system having the function of relaying the image without limiting the relay lens optical system.

Further, in accordance with still another aspect of the second exemplary embodiment of the present invention, it is preferable that the image display device include a color separation optical system to split the illumination light scanned by the illumination-light scanning optical system into illumination light with at least two colors and an image-inverting prism be disposed so as to invert the scanning direction of the image for at least one color of separated illumination light. According to this construction, since the image-inverting prism controls the scanning directions for each of the colors, respectively, in the image of the screen, it is possible that each of the scanning directions for each of the colors becomes equal from each other. As a result, for example, by illuminating the illumination lights keeping the scanning directions of the illumination lights for each of the colors equal to each other, since the construction is allowable in which a display such as intermittent lighting independently made by each of the colors separated in color is avoided, it is possible to reduce or prevent the flicker of the color which may be unpleasant to the human eye.

Further, in accordance with a third exemplary embodiment of the present invention, there is provided a projector including an image display device described above and the projection device to project the image displayed at the image display device further, in which the projector includes a color separation optical system to split the illumination light scanned by the illumination-light scanning optical system into illumination light with at least two colors and an illumination-light scanning optical system to scan the separated illumination light disposed for each of the colors. According to this construction, since the refraction angle of a rotating prism corresponding to the illumination light for each of the colors is changed and then is capable of controlling the illumination light for each of the colors, it is possible to illuminate after overlapping each of the illumination lights corresponding to each of the colors or to illuminate while avoiding to overlap the illumination lights for each of the colors in the image of the screen. As a result, since, for example, by overlapping and illuminating each of the illumination lights for each of the colors, a construction is allowable in which a display, such as intermittent lighting independently made by each of the colors separated in color is avoided, it is possible to reduce or prevent the flicker of the color which may be unpleasant to the human eye.

Further, in accordance with one aspect of the third exemplary embodiment of the present invention, it is preferable that an illumination-light scanning optical system for each of the colors be provided with at least one rotating prism to change the refractive angle of the illumination light, while rotating, to thus scan the illumination light and at least one rotating prism rotates in a direction different to the rotation directions of the other rotating prisms. According to this construction, since the scanning directions can be controlled for the illumination light of each of the colors, in the image of the screen, it is possible to make the scanning directions for each of the colors equal to each other. As a result, since, for example, by illuminating the illumination lights while keeping the scanning directions of the illumination lights for each of the colors equal to each other, a construction is allowable in which a display, such as intermittent lighting independently made by each of the colors separated in color is avoided, it is possible to reduce or prevent the flicker of the color which may be unpleasant to the human eye.

DETAILED DESCRIPTION OF PREFERRED EMBODIMENTS

Hereinafter, exemplary embodiments of the present invention will be explained in detail with reference to the accompanying figures. Further, it should be noted that the sprit and scope of the present invention is not limited by these exemplary embodiments of the present invention.

First Exemplary Embodiment

Figure 1:
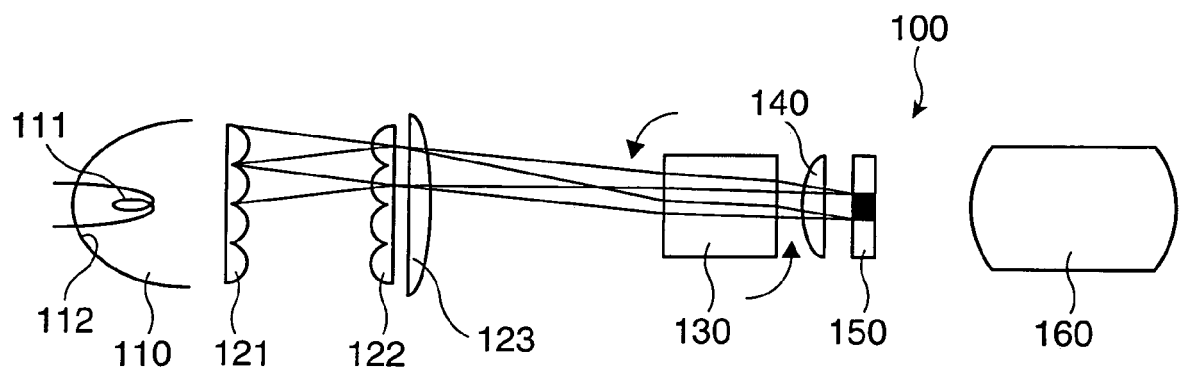
FIG. 1 is a schematic showing the concept of a projector in accordance with a first exemplary embodiment of the present invention.

FIG. 1 is a schematic for illustrating the concept of the projector in accordance with the first exemplary embodiment of the present invention. The projector 100 includes a light source 110, a pair of fly-eye lenses 121 and 122, a superposing lens 123, a rotating prism 130, a collimating lens 140, a liquid crystal light valve 150 and a projection lens 160.

The light source 110 is provided with a lamp 111 and a concave mirror 112. The lamp 111 is made of, for example, a discharge lamp, such as a high-pressure mercury lamp, and also the concave mirror 112 is made of a parabolic mirror. Further, the lamp 111 and the concave mirror 112 are not limited to those constructions. In the light source 110, the lamp 111 emits an illumination light, and the illumination light having a luminance distribution travels toward a pair of fly-eye lenses 121 and 122 by reflecting the illumination light emitted from the lamp by the concave mirror 112. At this time, if the lamp 111 is a LED light source, it is allowable that a construction employing a condensing lens in place of the concave mirror 112 to emit the illumination light to the fly-eye lenses 121 and 122 is employed or a construction arranging a plurality of LED light sources in the form of array is employed, and an appropriate change is allowable for the type, the number and the construction of the light source.

The fly-eye lenses 121 and 122 are a pair of lens arrays in which a plurality of micro lenses having a contour with a rectangular shape are arranged in the form of matrix. The external shapes, shown along the direction of an optical axis, of each of the micro lenses are formed with a different ratio from the external shape of the image-forming area of the liquid crystal light valve 150 as a spatial light modulator for forming image light by modulating the illumination light based on an electrical signal. Here, the external shape of the image-forming area of the liquid crystal light valve 150 is a rectangular shape having an aspect ratio of 4:3, and the external shape of each micro lens is a rectangular shape having a ratio of 4:1.

The fly eye lens 121 divides the illumination light emitted from the light source 110 into a plurality of partial light beams, and focuses each of the divided partial light beams on each of the micro lenses of the fly-eye lens 122. The fly eye lens 122 emits each of the plurality of divided partial light beams, and causes each of the emitted plurality of divided partial light beams to impinge on the superposing lens 123. Further, the superposing lens 123 superimposes the plurality of divided partial light beams and illuminates the superimposed plurality of divided partial light beams on the liquid crystal light valve 150 through a collimating lens 140. At this time, since the external shapes of each of the micro lenses have an aspect ratio of 4:1, it is possible that the illumination light having a uniform luminance distribution is illuminated on a region being narrower than the image-forming area of the liquid crystal light valve 150, i.e., a portion of ⅓ of the image-forming area. In other words, the fly-eye lenses 121 and 122 and the superposing lens 123 have the function that the illumination light can be irradiated onto a region which is smaller than the image-forming area by converting at least one of the shape and the size of the illumination light beam emitted from the light source 110. Further, for example, considering the construction in accordance with the exemplary embodiments of the present invention, although it is designed in such a way that a region (the region being narrower than the image-forming area) to be illuminated by the irradiation optical system is in excess of the image-forming area in a transverse direction, if the region is narrow with respect to a longitudinal direction, it does not depart from the major scope and sprit of the present invention. Further, the superposing lens 123 may superpose the illumination light not only on the image-forming area of the liquid crystal light valve 150 but on the conjugate plane with respect to the image-forming area. When the superposing lens superposes the illumination light on the conjugate plane with respect to the image-forming area, the illumination light to be superposed is imaged on the image-forming area by using the relay optical system or the relay imaging device.

Further, a rotating prism 130 capable of scanning the illumination light on the image-forming area as an illumination-light scanning optical system is disposed between the superposing lens 123 and the liquid crystal light valve 150, and the illumination light beam travels toward the liquid crystal light valve 150 after the illumination light beam passes through the rotating prism 130 with an optical axis shifted in relation to the rotation of the rotating prism 130 and the index of refraction. Incidentally, the rotating prism 130 that is made of a prism in the form of a rectangular column of a material such as a glass, is rotated by a motor (not shown).

Here, a schematic for illustrating the function of the rotating prism is described in detail in FIGS. 2(a)–(d). In the figure, there is explained a case that the rotating prism is rotated in counter clockwise direction with respect to an axis vertical to the surface of the drawing.

As shown in FIGS. 2(a)–(d), the position of the rotation of the rotating prism 130 represented by (a) illustrates the positional relationship that the illumination light is emitted from the left side to the right side in the figure by directly traveling the illumination light incident to the rotating prism 130 without refracting the illumination light. Further, for simplicity of explanation, the illumination light is represented by an optical line parallel to the optical axis. Further, hereinafter, the present invention is described by representing the illumination light as an optical line.

The rotating position of the rotating prism 130 represented by (b) shows the figure that the rotating prism 130 is rotated from 0° to 45° from the rotation position represented by (a) in a counter clockwise direction. In this case, the illumination light incident to the rotating prism 130 from the left side of the figure is emitted to the right side of the figure by refracting the illumination light to the upper side of the figure.

The rotation position of the rotating prism 130 represented by (c) illustrates the figure that the rotating prism 130 is rotated from 45° to 90° from the rotation position represented by (a) in a counter clockwise direction. In this case, the illumination light incident to the rotating prism 130 from the left side of the figure is emitted to the right side of the figure by refracting the illumination light to the lower side of the figure.

The rotation position of the rotating prism 130 represented by (d) illustrates the figure that the rotating prism 130 is rotated by an angle of 90° from the rotation position represented by (a) in a counter clockwise direction. In this case, similar to the case (a), it illustrates the figure that the illumination light is emitted from the left side of the figure to the right side in the figure by directly traveling the illumination light incident to the rotating prism 130 without refracting the illumination light. As described above, the illumination light passes through the rotating prism with the optical axis shifted in relation to the rotation of the rotating prism and the index of the refraction.

Referring back to FIG. 1, the illumination light passing through the rotating prism 130 is incident onto a liquid crystal light valve 150 after being collimated by the collimating lens 140. Since the illumination light passes through the rotating prism 130 as described above, the illumination light is illuminated while being scanned on the image-forming area of the liquid crystal light valve 150.

FIGS. 3(a)–(d) show schematics illustrating the scanning of the illumination light in the image-forming area of the liquid crystal light valve 150, which is changed in response to the rotation of the rotating prism 130. FIGS. 3(a) to (d) represent the irradiating areas of the illumination light when the illumination light is illuminated on the image-forming area of the liquid crystal light valve 150 by passing through the collimating lens 140 from the rotating prism 130 of the cases (a) to (d) represented by FIG. 2. Further, FIG. 3(e) represents the figure of an illumination light integrated during a predetermined time when the illumination light is continuously illuminated on the image-forming area of the liquid crystal light valve 150 by repeating (a) to (d) of FIG. 3.

Figure 2:
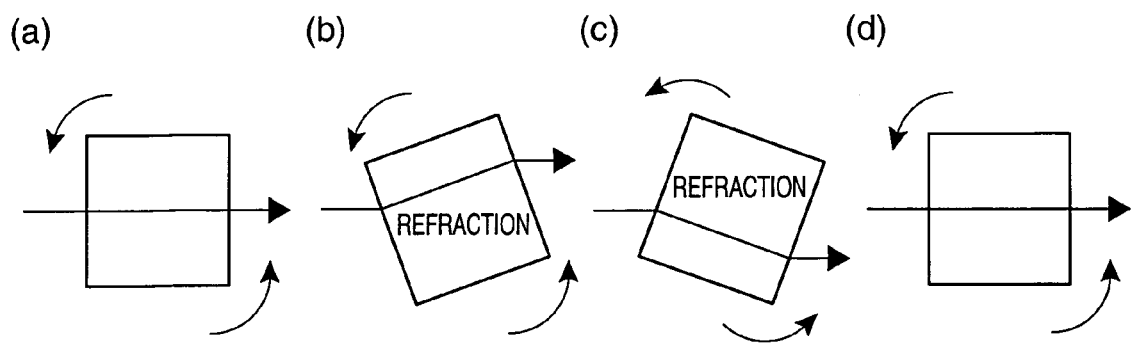
FIGS. 2(a)–(d) are explanatory views for illustrating the operation of the rotating prism.
Figure 3:
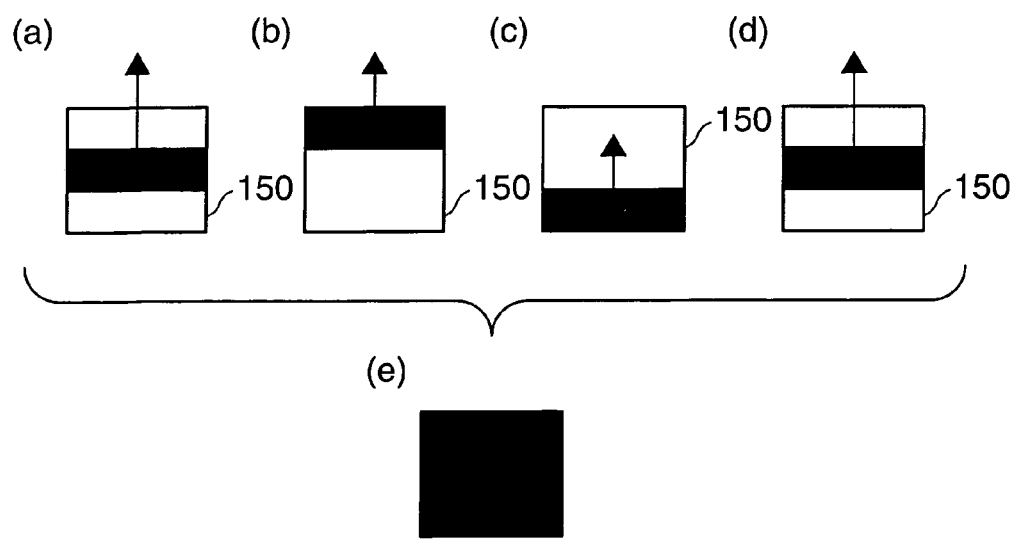
FIGS. 3(a)–(e) are explanatory views for explaining the scanning of the illumination light in the image-forming area of the light valve changing in response to the rotation of the rotating prism.

As shown in FIG. 3(a), the illumination light passing through the rotating prism in the rotation position of FIG. 2(a) is illuminated on a region being narrower than the image-forming area of the liquid crystal light valve 150, i.e., ⅓ portion of the image-forming area in the central portion of the image-forming area. Further, when the rotating prism is rotated similarly to (a) to (b) shown in FIG. 2, the irradiating region of the illumination light is shifted from the central portion of the image-forming area of the liquid crystal light valve 150 to the upper side end as shown in (a) to (b) of FIG. 3. Further, if the rotating prism is rotated similarly to (b) to (c) of FIG. 2, the irradiating region of the illumination light is shifted in such a way that the illumination light begins to irradiate the lower side end of the image-forming area of the liquid crystal light valve 150 as shown in (b) to (c) of FIG. 3. Further, if the rotating prism is rotated similarly to (c) and (d) of FIG. 2, the irradiating region of the illumination light is shifted from the lower side end of the image-forming area of the liquid crystal light valve 150 to the central portion thereof as shown in (c) and (d) of FIG. 3. Further, it is preferable that the recording direction of an electrical signal as the image data of the liquid crystal light valve 150 be corresponding to the direction for scanning the illumination light.

As stated above, if taking an integration for a predetermined time period, by repeating the scanning of the illumination light in the image-forming area of the liquid crystal light valve 150 at a high speed, it is possible that the illumination light having a uniform luminance distribution over the overall image-forming area is irradiated as shown in (e) of FIG. 3. Further, paying attention to the portion of the image-forming area, since the illumination light is generated or is not generated periodically, there occurs an effect equal to an intermittent lighting. Further, for example, considering a construction in accordance with the exemplary embodiment of the present invention, even if it is designed in such a way that the scanning area is in excess of the image-forming area in a longitudinal direction by the scanning of the illumination light, if the illumination light at the image-forming area is capable of scanning the illumination light on the image-forming area, it does not depart from the major scope and sprit of the present invention.

Referring back to FIG. 1, as described in FIG. 3, the illumination light incident to the image-forming area of the liquid crystal light valve 150 is emitted to a projection lens 160 by being modulated based on the electrical signal in the image-forming area of the liquid crystal light valve 150. Further, the liquid crystal light valve 150 is constructed by a pair of polarizing plates disposed at the liquid crystal panel and a front and a back of the liquid crystal panel. Further, the illumination light incident to the projection lens 160 as a projection device is projected on a screen (not shown), and then the image is displayed on the screen as an image light. In this time, the projection type may be either one of a type to project the image light at the front surface of the screen and a type to project the image light at the rear surface of the screen. Further, it is preferable that the projection device employ a curved surface mirror in place of the lens such as the projection lens 160.

According to the above, the projector 100 includes a light source 110 to emit an illumination light, a liquid crystal light valve 150 as a spatial light modulator having an image-forming area to form image light by modulating the illumination light based on an electrical signal, a pair of fly-eye lenses 121 and 122 and a superposing lens 123 as an irradiation optical system to irradiate the illumination light emitted from the light source 110 on a region being narrower than the image-forming area, and a rotating prism 130 as an illumination-light scanning optical system capable of scanning the illumination light emitted from the irradiation optical system on the image-forming area. By doing so, in momentary time, although only the illumination having a uniform luminance distribution on a part of the image-forming area of the spatial light modulator is implemented by the irradiation optical system, since the illumination light can be scanned on the image-forming area by the illumination-light scanning optical system in a certain range of the time, the illumination of the illumination light having a uniform luminance distribution over the overall image-forming area is implemented. As a result, if the image is projected onto the screen, the viewer can recognize the image with his eyes.

Further, paying attention to a part of the image-forming area, since the illumination light is generated or is not generated periodically, there occurs a phenomenon equal to an intermittent lighting. As a result, although the spatial light modulator is a hold type, the present invention can display clear moving pictures. Further, in case the illumination light is emitted from the light source with an amount of light equal to that of the related art projector, since the amount of the light does not change from the related art method, it can be displayed without being dark in comparison with the related art. Therefore, it is possible that a projector having a good brightness or a good utilization efficiency of a light is provided by improving the display performance of the moving picture.

Second Exemplary Embodiment

Hereinafter, a second exemplary embodiment of the present invention will be described in detail with reference to the accompanying drawings. It should be noted that the like reference numeral represents the same element as described in the first exemplary embodiment and the common descriptions for the operation and the function are omitted. Further, in the case of using a similar term, although the reference numerals are different, the functions thereof are substantially equal to each other, and then the basic explanation is omitted.

Figure 4:
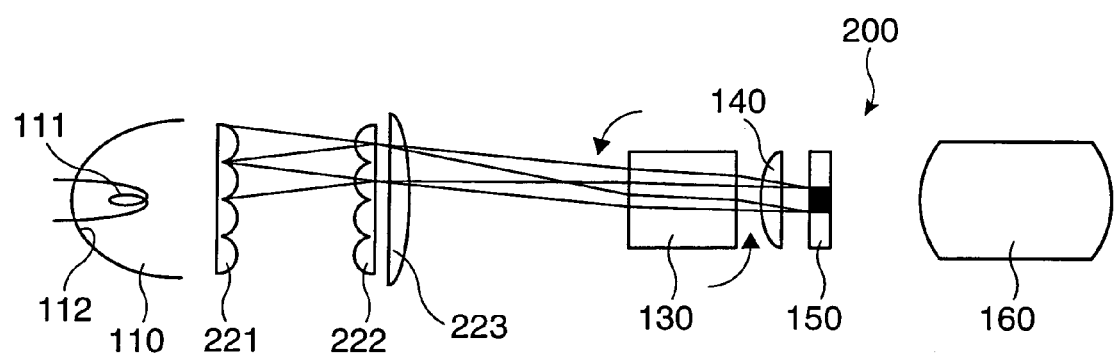
FIG. 4 is a schematic showing the concept of a projector in response to a second exemplary embodiment of the present invention.

FIG. 4 is a schematic for illustrating a concept of the projector in accordance with the second exemplary embodiment of the present invention. The projector 200 mainly includes a light source 110, a pair of cylindrical array lenses 221 and 222, a superposing lens 223, a rotating prism 130, a collimating lens 140, a liquid crystal light valve 150 and a projection lens 160.

Figure 5:
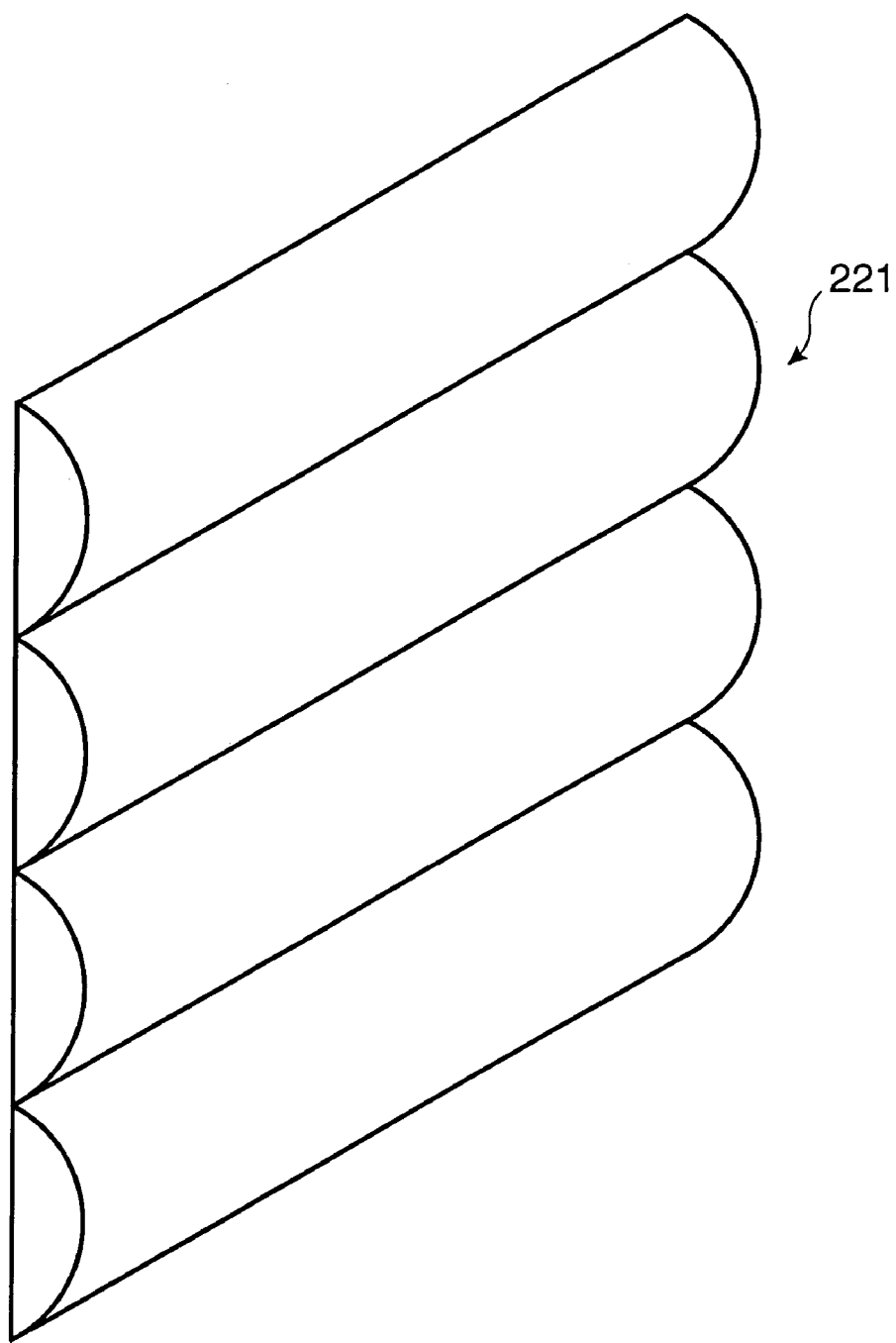
FIG. 5 is an explanatory view explaining the cylindrical array lens.

In the first exemplary embodiment of the present invention, a fly eye lens and a superposing lens are utilized as an irradiation optical system, whereas in the second exemplary embodiments of the present invention, as shown in FIG. 5, a lens array disposing a cylindrical lens to change the condensing magnification in only one direction, in the form of array is utilized as an irradiation optical system and a superposing lens having a longitudinal and transverse condensing magnification different from that of the first exemplary embodiment of the present invention is utilized. Since the other points are similar to those of the first exemplary embodiment of the present invention, the explanations therefore are omitted.

By the combination of the lens magnifications, the cylindrical array lenses 221 and 222 and the superposing lens 223 illuminate the illumination light having a uniform luminance distribution in a region being narrower than the image-forming area of the liquid crystal light valve 150, i.e., a portion of ⅓ of the image-forming area. In the projector 200, a rotating prism 130 as an illumination-light scanning optical system capable of scanning the illumination light on the image-forming area is disposed between the superposing lens 223 and the liquid crystal light valve 150, and the illumination light is passing through the rotating prism 130 while shifting the optical axis in relation of the rotation of the rotating prism 130 and the index of refraction. As a result, similar to the function represented in the first exemplary embodiment of the present invention, the illumination light is irradiated by keeping the luminance distribution thereof uniform with scanning on the image-forming area of the liquid crystal light valve 150.

Further, although the exemplary embodiments explain only the fly-eye lens, the cylindrical array lens and the superposing lens as the examples of the irradiation optical system, if there exists a system to meet the effect of the irradiation optical system, the present invention is not limited to these configurations. Further, the aspect ratio, the shape and the size of fly-eye lenses or the cylindrical lens, as a lens array, are not limited to those having the configurations of the exemplary embodiment of the present invention. Further, in the specification, although the exemplary embodiments of the present invention describe for the structure provided with the lens array unit and the superposing lens unit separately configured by an independent lens member, even if the lens array unit and the superposing lens unit are configured by the same member, it means that the structure has the lens array unit and the superposing lens unit.

As described above, by changing the external shape of the lens array unit or the combination of the condensing magnifications of the superposing lens unit, the second exemplary embodiment of the present invention obtains the effects similar to that of the first exemplary embodiment and at the same time, it is possible that the irradiation optical system to scan the illumination light on a region being narrower than all the region of the image-forming area is easily realized while matching the luminance distribution of the light source.

Third Exemplary Embodiment

In the exemplary embodiment of the present invention described hereinafter, the like reference numeral represents the same element as described in the aforementioned exemplary embodiment and the common descriptions for the operation and the function are omitted. Further, in the case of using the similar term, although the reference numerals are different, the functions thereof are substantially equal to each other, and then the basic explanation is omitted.

Figure 6:
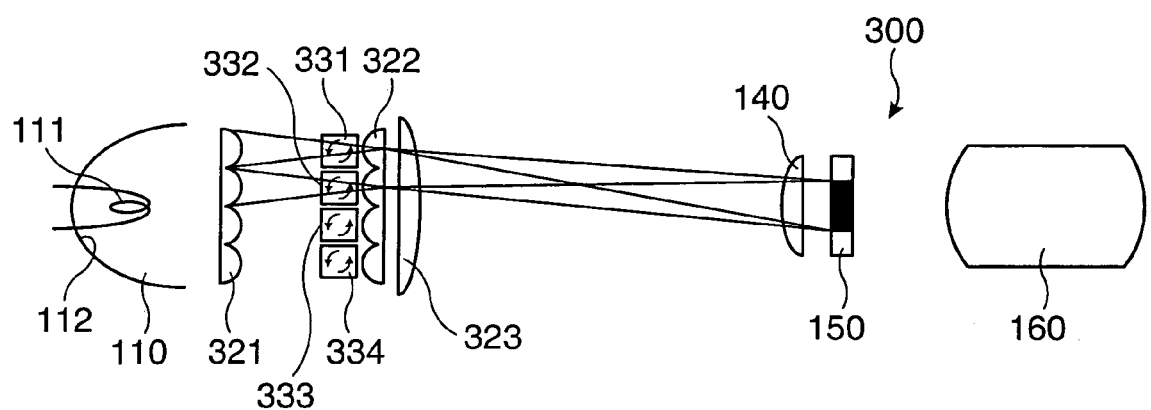
FIG. 6 is a schematics view for illustrating the construction of a projector in accordance with a third exemplary embodiment of the present invention.

FIG. 6 shows a schematic of a projector in accordance with the third exemplary embodiment of the present invention. The projector 300 mainly includes a light source 100, a pair of fly-eye lenses 321 and 322, a plurality of rotating prisms 331, 332, 333 and 334, a superposing lens 323, a collimating lens 140, a liquid crystal light valve 150, and a projection lens 160.

In the first exemplary embodiment of the present invention, only one rotating prism is disposed between the collimating lens and the superposing lens, whereas in the third exemplary embodiment of the present invention, a plurality of rotating prisms 331, 332, 333 and 334 are disposed between the fly-eye lenses 321 and 322 corresponding to each of the partial light beams split by the fly eye lens 321. More specifically, as shown in the figures, each rotating prism is placed in the corresponding set, respectively, by making the partial light beams with each of the rotating prism existing on the same column as a set. Since the other points are similar to those of the first exemplary embodiment of the present invention, the explanations therefore are omitted.

Further, the fly-eye lenses 321 and 322 and the superposing lens 323 as an irradiation optical system serve as an irradiation optical system to irradiate the illumination light having a uniform luminance distribution on a region of ½ size in the longitudinal direction of the image-forming area of the liquid crystal light valve 150 having the image-forming area with an aspect ratio of 4:3, that is, ½ portion of the overall area of the image-forming area. This represents an example that a shape of the region to irradiate the illumination light is different from that of the aforementioned exemplary embodiments.

Therefore, in the projector 300, since the plurality of rotating prisms 331, 332, 333 and 334 are disposed as an illumination-light scanning optical system capable of scanning the illumination light on the image-forming area, each of the partial light beams split by the fly eye lens 321 passes through the plurality of rotating prisms 331, 332, 333 and 334, while shifting the optical axis in relation to the rotations of the plurality of the rotating prisms 331, 332, 333 and 334 and the index of refraction. Further, each of the partial light beams is superimposed on the ½ portion of the image-forming area of the liquid crystal light valve 150 by the superposing lens 323, as a result, similar to the function represented in the first exemplary embodiment of the present invention, the illumination light is illuminated by keeping the luminance distribution thereof uniform while scanning on the image-forming area of the liquid crystal light valve 150.

As explained above, the plurality of rotating prisms 331, 332, 333 and 334 are disposed corresponding to the plurality of partial light beams split by the fly eye lens 321, since the scanning is implemented for each of the divided partial light beams by the plurality of rotating prisms, the third exemplary embodiment of the present invention obtains the effect similar to that of the first exemplary embodiment and at the same time, the construction in which the illumination light can be scanned on the image-forming area can be realized by disposing a relatively small rotating prism matched with the size of the partial light beam in the projector compactly.

Fourth Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are substantially equal to each other, and then the basic explanation is omitted.

Figure 7:
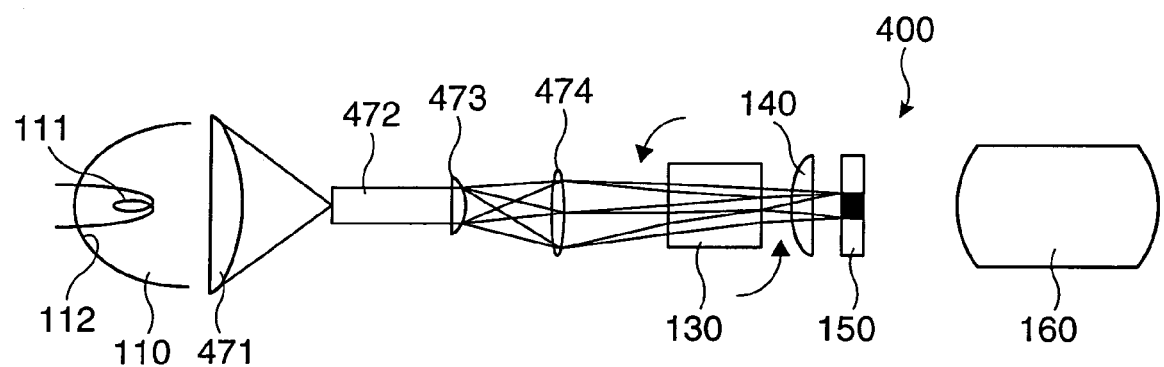
FIG. 7 is a schematic view for illustrating a projector in accordance with a fourth exemplary embodiment of the present invention.

FIG. 7 is a schematic for illustrating a projector 400 in accordance with a fourth exemplary embodiment of the present invention. The projector 400 mainly includes a light source 110, a condensing lens 471, a rod 472, a pair of imaging lenses 473 and 474, a rotating prism 130, a collimating lens 140, a liquid crystal light valve 150, and a projection lens 160.

In the first exemplary embodiment of the present invention, the fly eye lens and the superposing lens are utilized as an irradiation optical system, whereas, in the fourth exemplary embodiment of the present invention, the condensing lens 471, a rod 472, and the imaging lenses 473 and 474 are utilized as an irradiation optical system.

As shown in FIG. 7, the illumination light emitted from the light source 110 is incident onto an incident end of the rod 472, made of a material such as a glass, in the form of rectangular column by being condensed by the condensing lens 471. Further, the illumination light is emitted from the emission end while reflecting at the outside wall by using the total reflection condition of the interface in the outside wall of the rod 472. Further, the rod 472 is not limit to the rectangular column shape, but, a rod having an inside cavity surface formed of a reflective film can be also used.

The external shape of the emission end of the rod 472, viewed along the direction of an optical axis, is formed by changing the ratio and the external shape of the image-forming area of the liquid crystal light valve 150 as a spatial light modulator to form image light by modulating the illumination light based on an electrical signal. Here, the external shape of the image-forming area of the liquid crystal light valve 150 has a rectangular shape having an aspect ratio of 4:3, and the external shape of the emission end of the rod 472 has a rectangular shape having an aspect ratio of 4:1.

Further, since the illumination light emitted from the rod 472 passes through the imaging lenses 473 and 474 constructed as an imaging lens unit to image the image emitted from the emission end of the rod 472 on the image-forming area of the liquid crystal light valve 150, and the collimating lens 140, it is possible that the illumination light having a uniform luminance distribution is illuminated on a region being narrower than the image-forming area of the liquid crystal light valve 150, i.e., a portion of ⅓ of the image-forming area. Here, since the rotating prism 130 is disposed between the rod 472 and the liquid crystal light valve 150 as an illumination-light scanning optical system to scan the illumination light on the image-forming area, the illumination light passes through the rotating prism 130 while shifting the optical axis in relation to the rotation of the rotating prism 130 and the index of the refraction. As a result, similar to the function represented in the first exemplary embodiment of the present invention, the illumination light is illuminated while being scanned on the image-forming area of the liquid crystal light valve 150.

Further, in the specification, the imaging lens unit to image the image emitted from the emission end of the rod on the image-forming area is not necessarily limited to that with the aspect ratio of 1:1 of the image. Therefore, although the aspect ratio of the image is changed, the meaning of the imaging is the same in the imaging lens unit. Further, the shape of the emission end of the rod is not limit to the aspect ratio, the shape and the size as described above.

As explained above, in accordance with the fourth exemplary embodiment of the present invention, it obtains an effect similar to that of the first exemplary embodiment and at the same time, the irradiation optical system to irradiate the illumination light on a region being narrower than the whole area of the image-forming area is easily realized while matching the luminance distribution of the light source by the combination of the shape of the terminal end of the rod member and the condensing magnification of the imaging lens unit.

Fifth Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are substantially equal to each other, and then the basic explanation is omitted.

Figure 8:
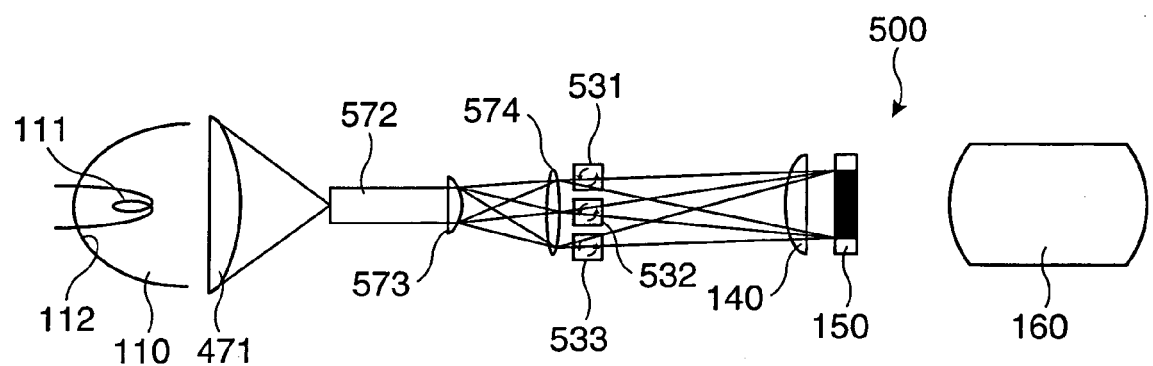
FIG. 8 is a schematic view for illustrating a projector in accordance with a fifth exemplary embodiment of the present invention.

FIG. 8 shows a schematic for illustrating a projector in accordance with a fifth exemplary embodiment of the present invention. The projector 500 mainly includes a light source 110, a condensing lens 471, a rod 572, a pair of imaging lenses 573 and 574, a plurality of rotating prisms 531, 532 and 533, a collimating lens 140, a liquid crystal light valve 150, and a projection lens 160.

In the fourth exemplary embodiment of the present invention, there is explained that only one rotating prism is disposed between the rod 472 and the liquid crystal light valve 150, whereas, in the fifth exemplary embodiment of the present invention, the plurality of rotating prisms 531, 532 and 533 are disposed between the rod 572 and the liquid crystal light valve 150 corresponding to the partial light beam divided after emitting from the rod 572. More specifically, as shown in the drawing, one rotating prism is placed in the corresponding set, respectively, by making the partial light beams with each of the rotating prisms existing on the same column as a set. Since the other points are similar to those of the fourth exemplary embodiment of the present invention, the explanations therefore are omitted.

Further, the rod 572 as an irradiation optical system, a pair of imaging lenses 573 and 574 and a collimating lens 140 function as irradiation optical system to scan the illumination light having a uniform luminance distribution in a region having ⅔ size, in a longitudinal direction, of the image-forming area of the liquid crystal light valve 150 having the image-forming area with an aspect ratio of 4:3, i.e., the ⅔ portion of the overall area of the image-forming area. These represent another example of shape for a region to scan the illumination light different from that of the exemplary embodiments described above.

Therefore, in the projector 400, since the plurality of rotating prisms 531, 532 and 533 are disposed as an illumination-light scanning optical system capable of scanning the illumination light on the image-forming area, each of the partial light beams divided after the emission of the rod 572 passes through the plurality of rotating prisms 531, 532 and 533 while shifting the optical axis in relation to the rotations of the plurality of rotating prisms 531, 532 and 533 and the index of refraction. Further, since each of the partial light beams divided after the emission of the rod 572 passes through the imaging lenses 573 and 574 configured by an image lens unit to image the image of the emission end of the rod 572 on the image forming region of the liquid crystal light valve 150, and the collimating lens 140, and is illuminated on the ⅔ portion of the image forming region of the liquid crystal light valve 150, as a result, similar to the function represented in the first exemplary embodiment of the present invention, the illumination light is scanned by illuminating the luminance distribution uniformly while being scanned on the image-forming area of the liquid crystal light valve 150.

As stated above, in accordance with the fifth exemplary embodiment of the present invention, since the scanning is implemented for each of the partial light beams by the plurality of the rotating prisms, the present invention obtains an effect similar to that of the first exemplary embodiment and at the same time, an optical system utilizing a rod constructed compactly by disposing a relatively small size of rotating prism while accommodating the size of the partial light beams in the projector can be implemented.

Sixth Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are equal to each other, and then the basic explanation is omitted.

Figure 9:
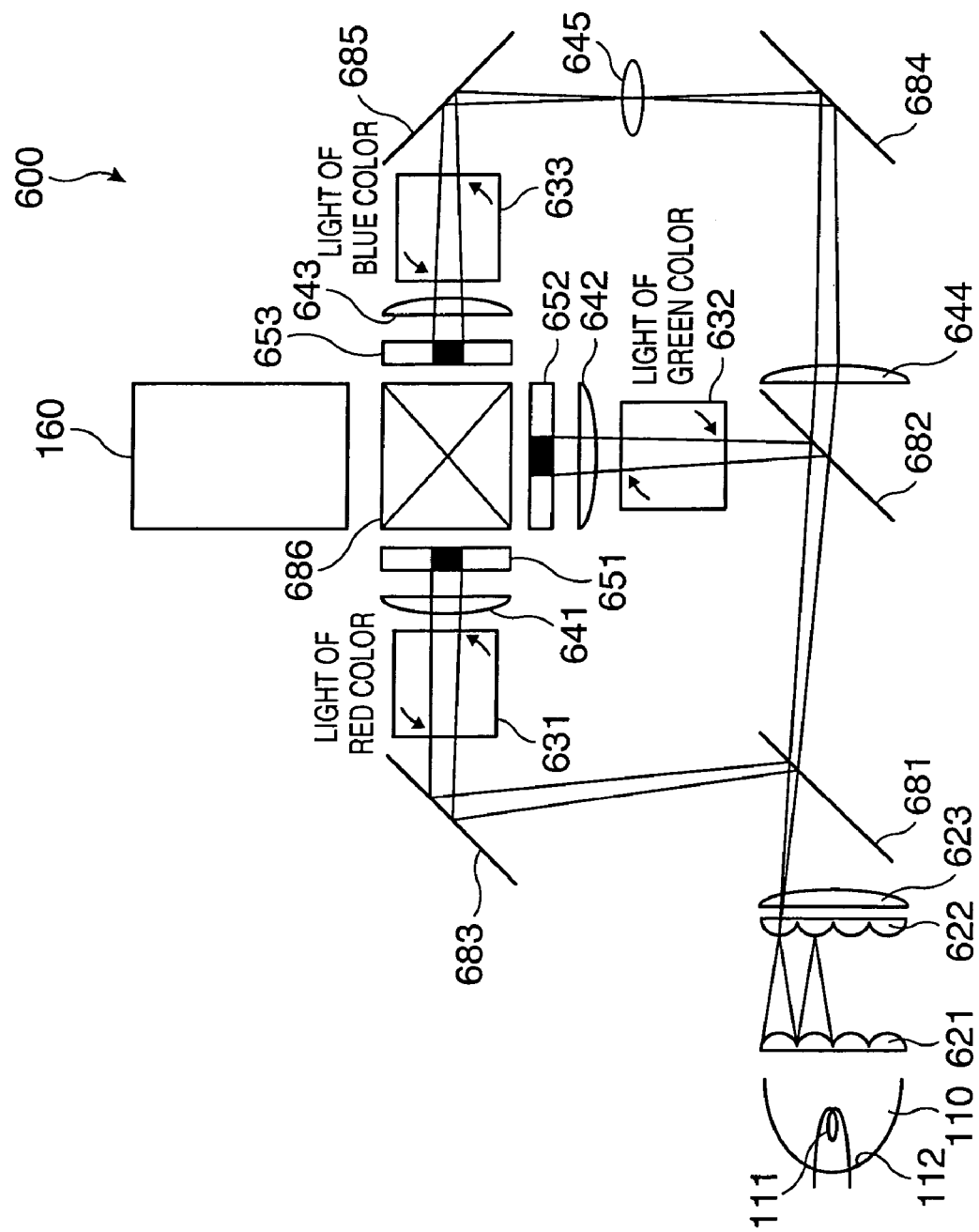
FIG. 9 is a schematic view for illustrating a projector in accordance with a sixth exemplary embodiment of the present invention.

FIG. 9 shows a schematic for illustrating a projector in accordance with a sixth exemplary embodiment of the present invention. The projector 600 mainly includes a light source 110, a pair of fly-eye lenses 621 and 622, a superposing lens 623, a plurality of rotating prisms 631, 632 and 633, a pair of dichroic mirrors 681 and 682, a plurality of reflective mirrors 683, 684 and 685, a plurality of collimating lenses 641, 642 and 643, a plurality of relay lenses 644 and 645, a plurality of liquid crystal light valve 651, 652 and 653, a dichroic prism 686, and a projection lens 160.

The illumination light emitted from the light source 110, after passing through the fly-eye lenses 621 and 622 and the superposing lens 623, illuminates toward the dichroic mirror 681, serving as a color separation optical system. Further, the fly-eye lenses 621 and 622 as an irradiation optical system and a superposing lens 623 function as an irradiation optical system to illuminate the illumination light having a uniform luminance distribution in a ¼ sized, in a traverse direction, region of the image-forming area of the plurality of the liquid crystal light valves 651, 652 and 653 having the image-forming area with an aspect ratio of 4:3, i.e., a portion of ¼ of the overall area of the image-forming area. This represents an example that a shape of the region to illuminate the illumination light is different from that of the aforementioned exemplary embodiments.

As shown in FIG. 9, among the illumination lights irradiated to the dichroic mirror 681 as a color separation optical system, a red light is reflected by the dichroic mirror 681, and is illuminated as an illumination light having a uniform luminance distribution in a region being narrower than the image-forming area of the liquid crystal light valve 651, i.e., a portion of ¼ of the image-forming area via a reflective mirror 683 and a collimating lens 641. Among the illumination lights irradiated toward the dichroic mirror 681 as a color separation optical system, the green light and the blue light are capable of transmitting the dichroic mirror 681 and illuminates toward the dichroic mirror 682 as a color separation optical system.

Among the illumination lights irradiated toward the dichroic mirror 682 as a color separation optical system, the green light is reflected at the dichroic mirror 682, and is illuminated as an illumination light having a uniform luminance distribution in a region being narrower than the image-forming area of the liquid crystal light valve 652, i.e., a portion of ¼ of the image-forming area via a collimating lens 642. Among the illumination lights irradiated toward the dichroic mirror 682 as a color separation optical system, the blue light transmits the dichroic mirror 682, and is illuminated as an illumination light having a uniform luminance distribution in a region being narrower than the image-forming area of the liquid crystal light valve 653, i.e., a portion of ¼ of the image-forming area via a pair of reflective mirrors 684 and 685, a pair of relay lenses 644 and 645 configured as a relay lens optical system, and a collimating lens 643.

Further, the relay lens optical system is disposed on the optical path of the blue light to compensate for the difference between the superposition for each of the colors due to the differences between the lengths of the optical paths. That is, by disposing on the optical path of the blue light the relay lenses 644 and 645, serving as a relay lens optical system to transmit the image, while keeping the same size before the incidence and after the emission thereof, and the collimating lens 643, the effect due to the difference of lengths between the optical paths is suppressed to superpose the illumination lights for each of the colors on the image-forming areas of the plurality of liquid crystal light valves 651, 652 and 653. Therefore, in the image-forming areas of each of the liquid crystal light valves 651, 652 and 653, the illumination lights having a uniform luminance distribution can be generated on the ¼ region of the image-forming area.

Here, since a plurality of rotating prisms 631, 632 and 633 are disposed for each of the colors as an illumination-light scanning optical system capable of scanning the illumination light on the image-forming area, the illumination lights for each of the colors can pass through the plurality of rotating prisms 631, 632 and 633 while shifting the optical axis in relation to the rotation of the rotating prisms 631, 632 and 633 and the index of the refraction.

As a result, the exemplary embodiment of the present invention are different from the first exemplary embodiment of the present invention, in that the illumination light irradiated on the ¼ region of the image-forming area is scanned along a direction of a long side of the image-forming area of the liquid crystal light valve in relation to the shape of the illumination light, the rotating axis of the rotating prisms and the arrangement of the liquid crystal light valve whereas, similar to the function represented in the first exemplary embodiment, the illumination lights are illuminated while being scanned on the image-forming area of the plurality of liquid crystal light valves 651, 652 and 653.

Therefore, by repeating the scanning of the illumination light at a high speed in the image-forming area of the liquid crystal light valves 651, 652 and 653, if taking integration for a certain time period, the irradiation of the illumination light having a uniform luminance distribution at the image-forming area can be implemented. Further, paying attention to a part of the image forming region, since the illumination light is generated or is not generated periodically, there is occurred an effect equal to an intermittent lighting.

Referring back to FIG. 9, the illumination lights for each of the colors incident to the image-forming areas of the plurality of the liquid crystal light valves 651, 652 and 653 are modulated in the image-forming areas of the plurality of the liquid crystal light valves 651, 652 and 653 based on an electrical signal, and guided to the direction of the projection lens 160 by the dichroic prism 686 as a color synthesizing optical system. Further, the dichroic prism 686 has a function for forming, by attaching 4 triangle prisms, a first optical multi layer film capable of transmitting a green light by reflecting a red light and a second optical multi layer film capable of transmitting a green light by reflecting the blue light at the interfacing surface of the attached triangle prisms, and for synthesizing the red light, the green light and the blue light incident from three different directions, respectively, to emit the synthesized light beam to the projection lens 160. Further, the illumination light incident to the projection lens 160 is projected on a screen (not shown) and the image is displayed on the screen as an image light.

At this time, the plurality of rotating prisms 631, 632 and 633 are independently controlled by a controlling unit (not shown) and are rotated. As shown in the drawing as an arrow, by rotating the rotating prism 632 in a direction opposite to that of the rotating prisms 631 and 633, the illumination light is controlled so that the scanning directions of the image lights irradiated onto the screen are corresponding to each of the colors. Further, by changing the refraction angle of the rotating prism corresponding to each of the colors, the scanning of the illumination light is controlled in such a way that each of the colors is overlapped in the image lights on the screen.

As stated above, in accordance with the sixth exemplary embodiment of the present invention, since the projector 600 is provided with the dichroic mirrors 681 and 682 as a color separation optical system to separate the illumination light, and also, includes the plurality of rotating prisms 631, 632 and 633 disposed for each of the colors, respectively, as an illumination-light scanning optical system to scan the illumination light, the sixth exemplary embodiment of the present invention is capable of obtaining an effect similar to that of the first exemplary embodiment.

Further, at the same time, it is allowable that the scanning direction and the illumination position are equal to each other for each of the colors in the image of the screen in response to the difference between the rotation direction of at least one rotating prism, that is, the rotating prism 632, in the exemplary embodiment of the present invention, and the rotation directions of the other rotating prisms 631 and 633, and it is possible to reduce or prevent such a flicker of the color as to be unpleasant to the human eye as the structure in which a display such as independent and intermittent lighting due to each of the colors can be avoided.

Seventh Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are substantially equal to each other, and then the basic explanation is omitted.

Figure 10:
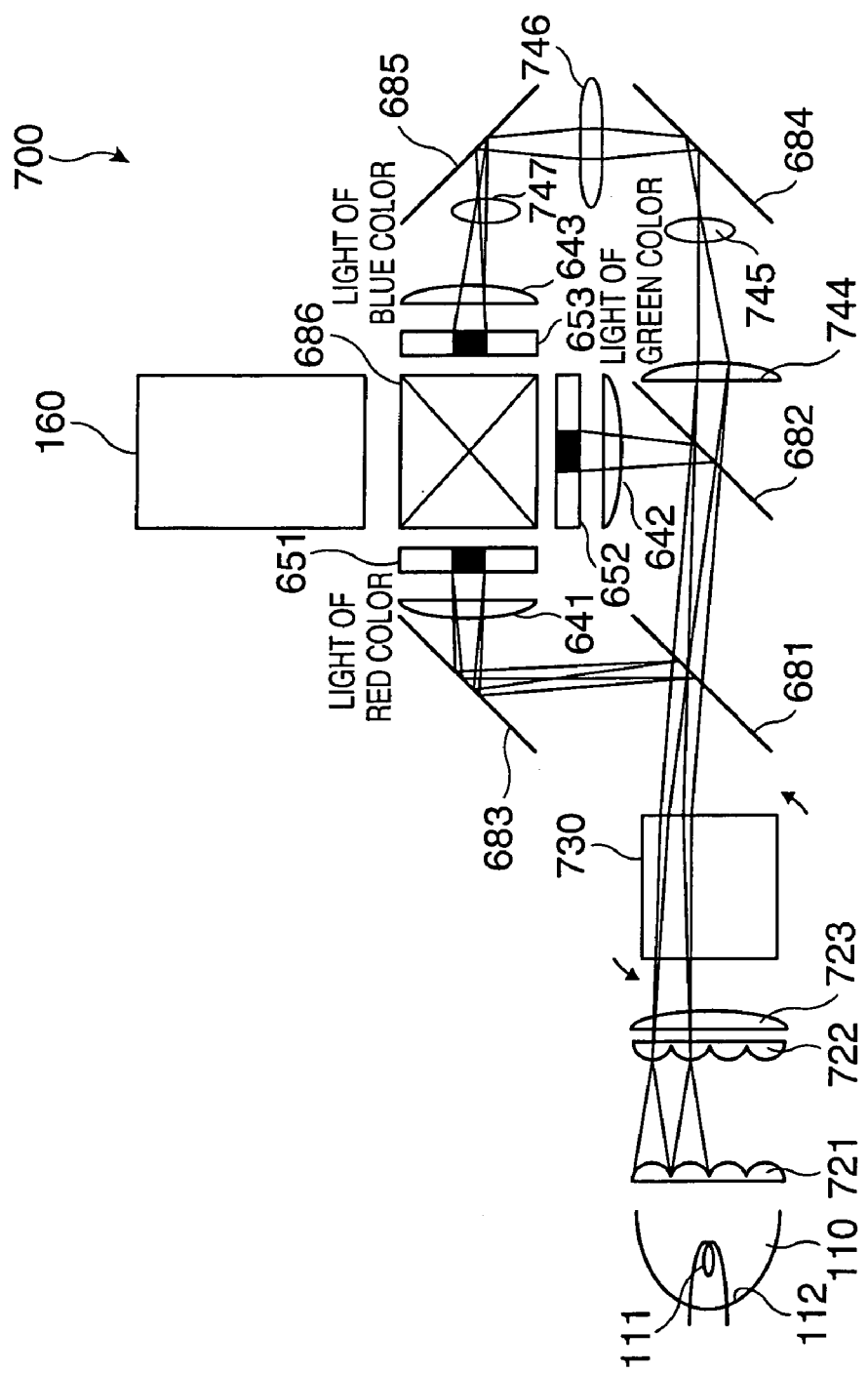
FIG. 10 is a schematic view for illustrating a projector in accordance with a seventh exemplary embodiment of the present invention.

FIG. 10 shows a schematic for illustrating a projector in accordance with a seventh exemplary embodiment of the present invention. The projector 700 mainly includes a light source 110, a pair of fly-eye lenses 721 and 722, a superposing lens 723, a rotating prisms 730, a pair of dichroic mirrors 681 and 682, a plurality of reflective mirrors 683, 684 and 685, a plurality of collimating lenses 641, 642 and 643, a plurality of relay lenses 744, 745, 746 and 747, a plurality of liquid crystal light valves 651, 652 and 653, a dichroic prism 686, and a projection lens 160.

In the sixth exemplary embodiment of the present invention, the rotating prisms are disposed for each of the colors, respectively, and a set of the relay lens optical system is utilized, whereas, in the seventh exemplary embodiment of the present invention, the rotating prism 730 is disposed at the rear end of the superposing lens, and two set of systems, i.e., a system including a plurality of relay lenses 744, 745 and 746 of a relay lens optical system as a relay imaging device and a system including a pair of relay lenses 746 and 747 and a collimating lens 643, are utilized.

The illumination light emitted from the light source 110, by passing through the fly-eye lenses 721, 722 and the superposing lens 723, is irradiated to the rotating prism 730. Further, the illumination light incident to the rotating prism 730, while shifting the optical axis in relation to the rotation of the rotating prism 730 and the index of the refraction, passes through the rotating prism 730. Further, the illumination light, after being divided into a red light, a green light and a blue light by the dichroic mirror 681 and 682 as a color separation optical system, is illuminated while being scanned on the image-forming areas of the plurality of liquid crystal light valves 651, 652 and 653 corresponding to each of the colors, respectively, via the mirrors and the lenses disposed on the optical paths for each of the colors. Like this, in the exemplary embodiment of the present invention, a color separation optical system is prepared at the rear side of the rotating prism 730 as an illumination-light scanning optical system. By doing so, by arranging at least one of rotating prism 730, it is possible to implement the moving picture display of clear full color images.

Further, the illumination lights for each of the colors incident to the image-forming areas of the plurality of the liquid crystal light valves 651, 652 and 653, are guided toward the direction of the projection lens 160 by the dichroic prism 686 as a color synthesizing optical system by being modulated in the image-forming areas of the plurality of liquid crystal light valves 651, 652 and 653 based on the electrical signal. Further, the illumination light incident to the projection lens 160 is projected onto a screen (not shown) and the image is displayed on the screen as an image light.

At this time, since on an optical path of an illumination light having a long optical path, that is, of the blue light, among the illumination lights divided in color by the dichroic mirrors 681 and 682 as the color separation optical system, a system including the plurality of relay lenses 744, 745 and 746 as a relay lens optical system to transmit the image in the same direction before the incidence and after the emission and a system including the relay lenses 746 and 747 and the collimating lens 643 are arranged as two sets, the illumination light is projected in such a way that the scanning directions for each of the colors are corresponding to each other for the image light to be irradiated on the screen.

Figure 11:
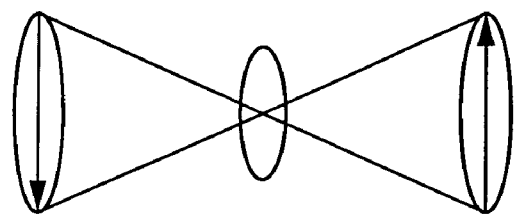
FIG. 11 is a schematic for illustrating a figure of an image in a construction using one set of the relay lens optical system.
Figure 12:
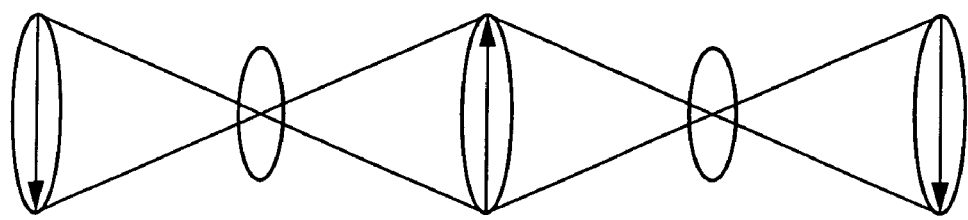
FIG. 12 is a schematic for illustrating a figure of an image in a construction using two sets of the relay lens optical systems.

That is, in case the one set of relay lens optical system is employed, the directions of the images before the incidence and after the emission are inverted as represented by a pair of arrows shown in FIG. 11, whereas, in case the two sets of the relay lens optical systems are employed, the directions of the images before the incidence and after the emission are equal to each other as represented by arrows shown in FIG. 12, so that also in the projector 700, with regard to the image of the scanning direction, the directions of the images before the incidence and after the emission become equal, whereby the phenomenon that only the blue light is scanned in a direction opposite to those of the red light and the green light in the image lights illuminated onto the screen can be avoided, even if the relay lens is employed.

As described above, in accordance with the seventh exemplary embodiment of the present invention, a projector 700 includes a pair of dichroic mirrors 681 and 682 as a color separation optical system to separate the illumination light, and also, in an optical path of a illumination light having a long optical path among the illumination lights separated in color, specifically in the optical path of the blue light of the exemplary embodiment, a relay lens optical system is arranged as a relay imaging device to transmit the images in the same direction before the incidence and after the emission, so that the present invention can obtain the same effect as that of the first exemplary embodiment of the present invention and at the same time, can avoid an adverse effect to invert in the scanning direction of the image although the relay lens optical system is employed.

Figure 13:
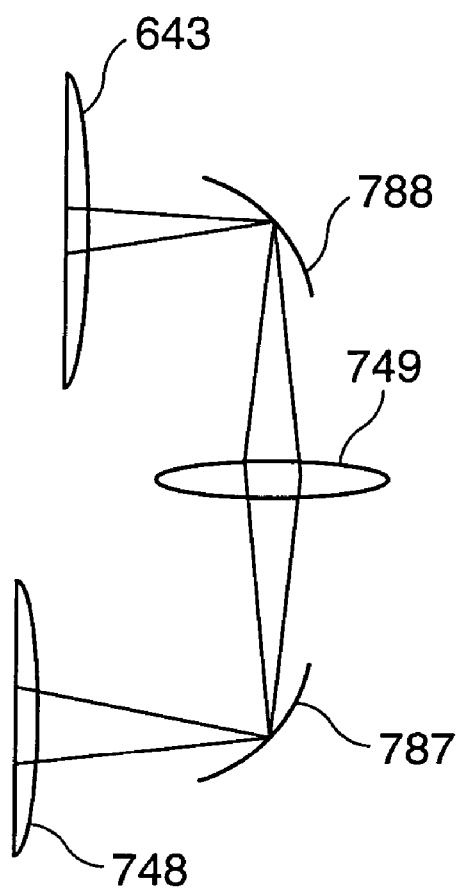
FIG. 13 is a schematic of a modified example for illustrating a figure of an image in a construction using two sets of the relay lens optical systems.

Further, in the exemplary embodiment of the present invention, although the present invention employs the system including the plurality of relay lenses 744, 745 and 746 and the system including the relay lenses 746 and 747 and the collimating lens 643 as a relay lens optical system to transmit the image in the same direction before the incidence and after the emission, the present invention is not limited to these exemplary embodiments, but, as shown in FIG. 13, the system can be replaced with a relay lens optical system constructed by a system including a relay lens 748, a curved surface mirror 787 and a relay lens 749 and a system including a relay lens 749, a curved surface mirror 788 and a collimating lens 643.

Eighth Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are substantially equal to each other, and then the basic explanation is omitted.

Figure 14:
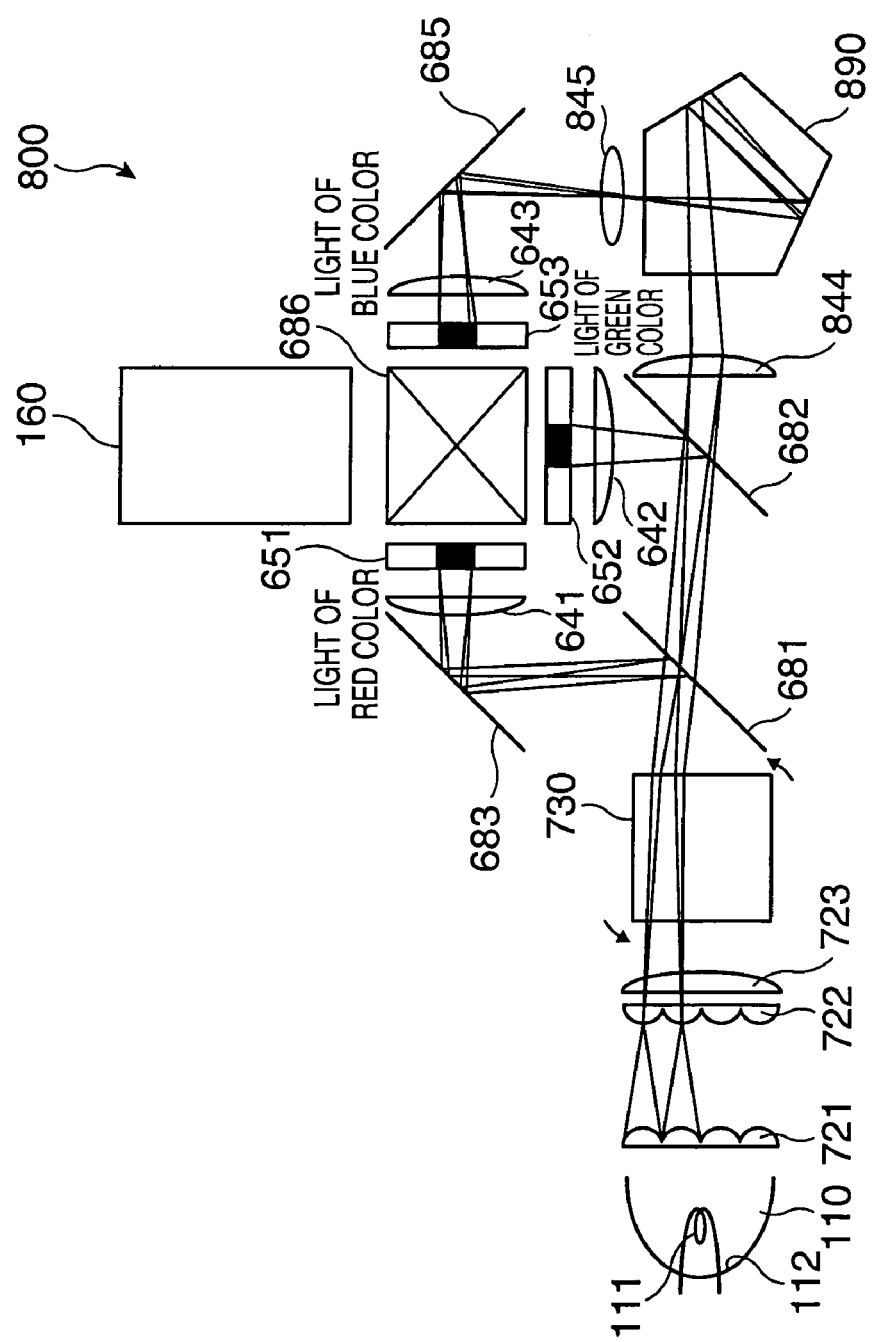
FIG. 14 is a schematic view for illustrating a projector in accordance with an eighth exemplary embodiment of the present invention.

FIG. 14 shows a schematic for illustrating a projector in accordance with an eighth exemplary embodiment of the present invention. A projector 800 mainly includes a light source 110, a pair of fly-eye lenses 721 and 722, a superposing lens 723, a rotating prisms 730, a pair of dichroic mirrors 681 and 682, a pair of reflective mirrors 683 and 685, a plurality of collimating lenses 641, 642 and 643, a pair of relay lenses 844 and 845, an image-inverting prism 890, a plurality of liquid crystal light valves 651, 652 and 653, a dichroic prism 686, and a projection lens 160.

In the seventh exemplary embodiment of the present invention, although the two sets of the relay lens optical systems are employed, in the eighth exemplary embodiment of the present invention, there is a difference in that a set of relay lens optical system is configured by a pair of relay lenses 844 and 845 and a collimating lens 643 and an image-inverting prism 890 is arranged in the optical path thereof. Therefore, since the explanations for the red light and the green light are similar to those of the seventh exemplary embodiment of the present invention, the explanations are omitted, and the explanation for the blue light arranged in the relay lens optical system is described hereinafter.

Referring to FIG. 14, since one set of relay lens optical system is utilized in the optical path of the blue light, in accordance with the explanation described above, the scanning direction of the image is inverted, and only the blue light is scanned in a direction opposite to those of the red light and the green light in the image light irradiated onto the screen. However, since, in addition, an image-inverting prism 890 is arranged in the optical path of the blue light for inverting the scanning direction for the images, finally, the effect that only the blue light is scanned in a direction opposite to those of the green light and the red light is avoided without inverting the scanning direction of the image. Further, the image-inverting prism employed in this exemplary embodiment is the form of a penta prism and is capable of inverting the image as shown in FIG. 15.

As described above, in accordance with the eighth exemplary embodiment of the present invention, since the projector 800 is provided with the dichroic mirrors 681 and 682 as a color separation optical system to separate the illumination light, and also, is arranged by an image-inverting prism 890 for inverting the scanning direction of the image for at least one of the illumination lights divided in color, the present exemplary embodiment can obtain an effect similar to that of the first exemplary embodiment of the present invention, and at the same time, can avoid an adverse effect due to the inversion of the scanning direction of the image although the relay lens optical system is employed.

Figure 15:
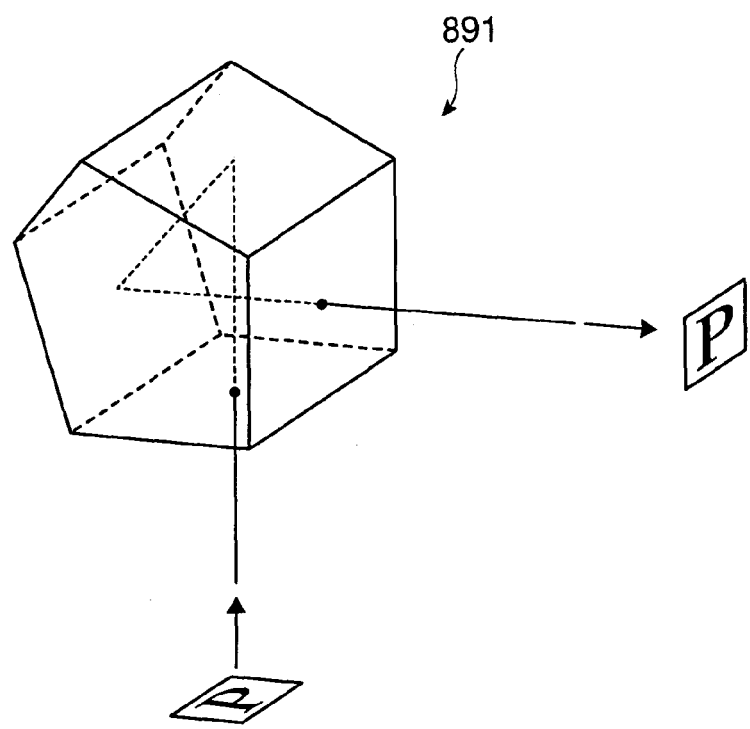
FIG. 15 is a schematic for illustrating a penta prism being one type of an image-inverting prism.
Figure 16:
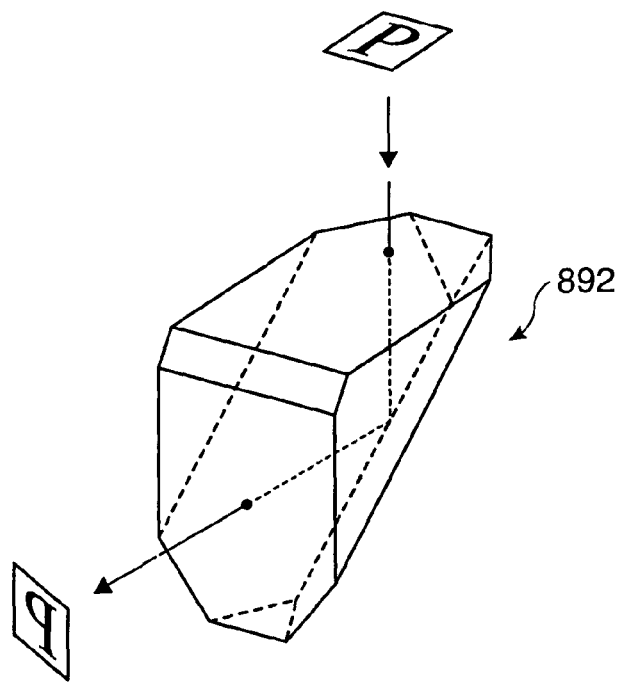
FIG. 16 is a schematic for illustrating a roof prism being one type of an image-inverting prism.
Figure 17:
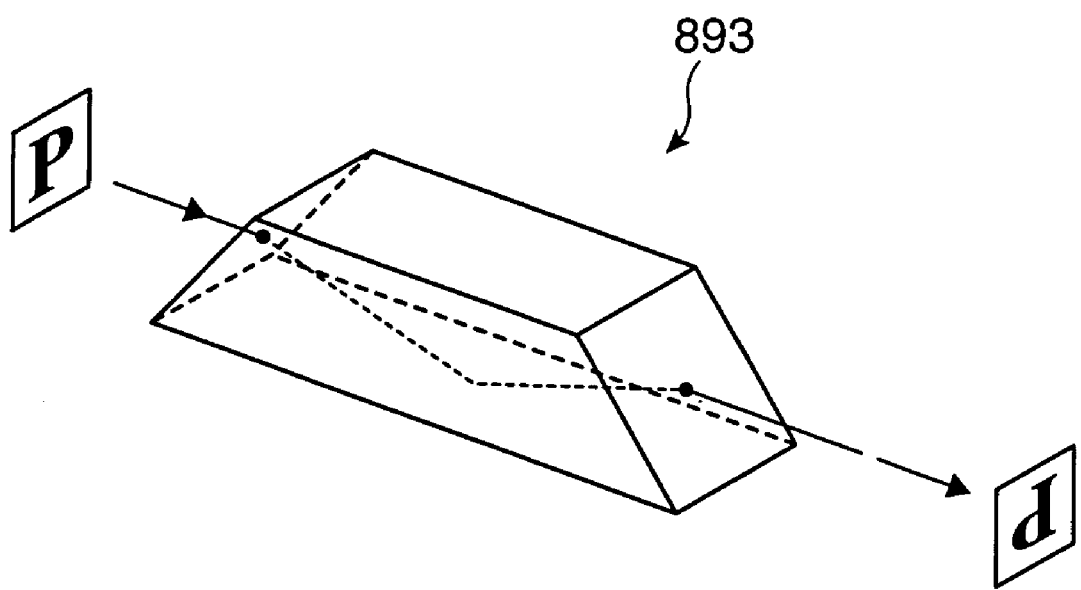
FIG. 17 is a schematic for illustrating a dove prism being one type of an image-inverting prism.
Figure 18:
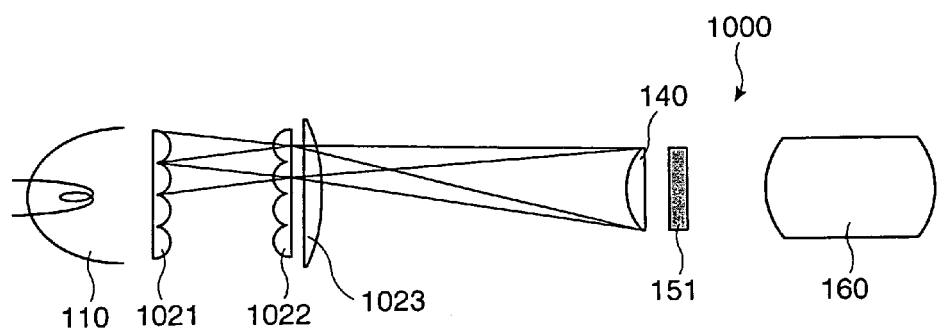
FIG. 18 is an explanatory view for illustrating a concept of a related art projector.
Figure 19:
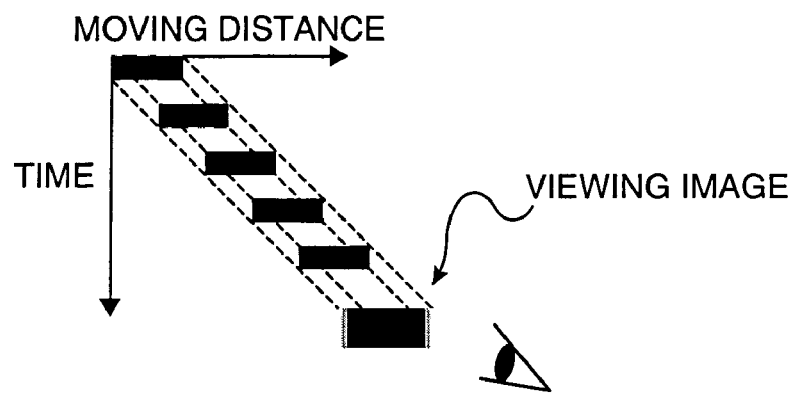
FIG. 19 is an explanatory view for illustrating a moving picture display performance of an impulse-type display.
Figure 20:
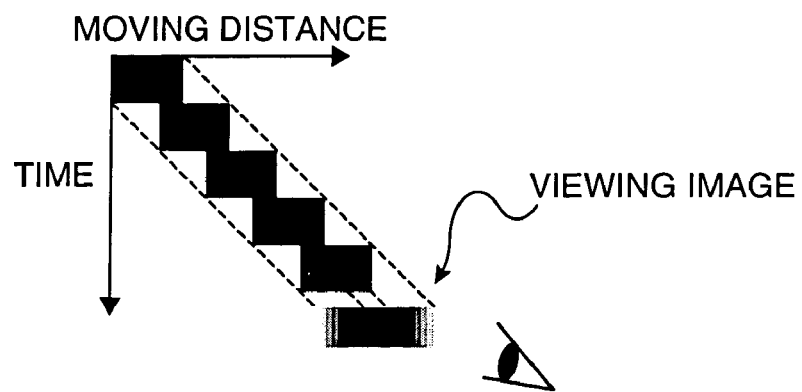
FIG. 20 is an explanatory view for illustrating a moving picture display performance of a hold-type display.
Figure 21:
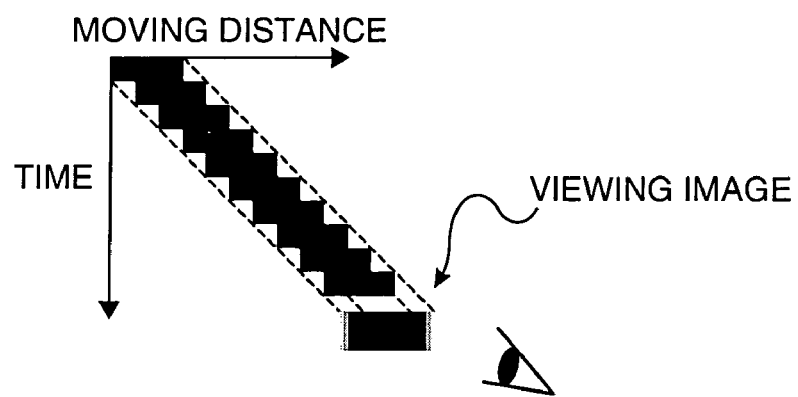
FIG. 21 is an explanatory view for illustrating one example of a method for improving the moving picture display performance of the hold-type display.
Figure 22:
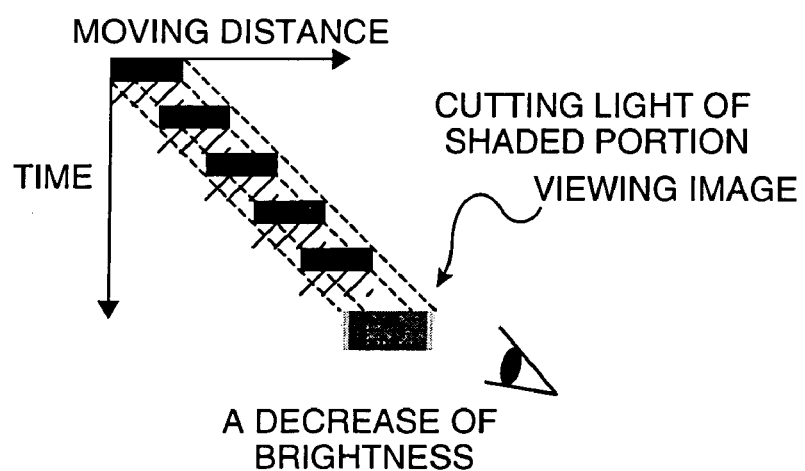
FIG. 22 is an explanatory view for illustrating one example of a method for improving the moving picture display performance of the hold-type display.

Further, in accordance with the exemplary embodiments of the present invention, although the penta prism 891 is employed as an image-inverting prism as shown in FIG. 15, it is allowable that a roof prism 892, shown in FIG. 16, or a dove prism 893 shown in FIG. 17 is appropriately arranged with accommodated with the optical system.

Ninth Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are substantially equal to each other, and then the basic explanation is omitted. In each of the exemplary embodiments of the present invention described above, a liquid crystal light valve of a transmission type is utilized, whereas, in the ninth exemplary embodiment, a liquid crystal light valve of a reflective type is utilized.

Figure 23:
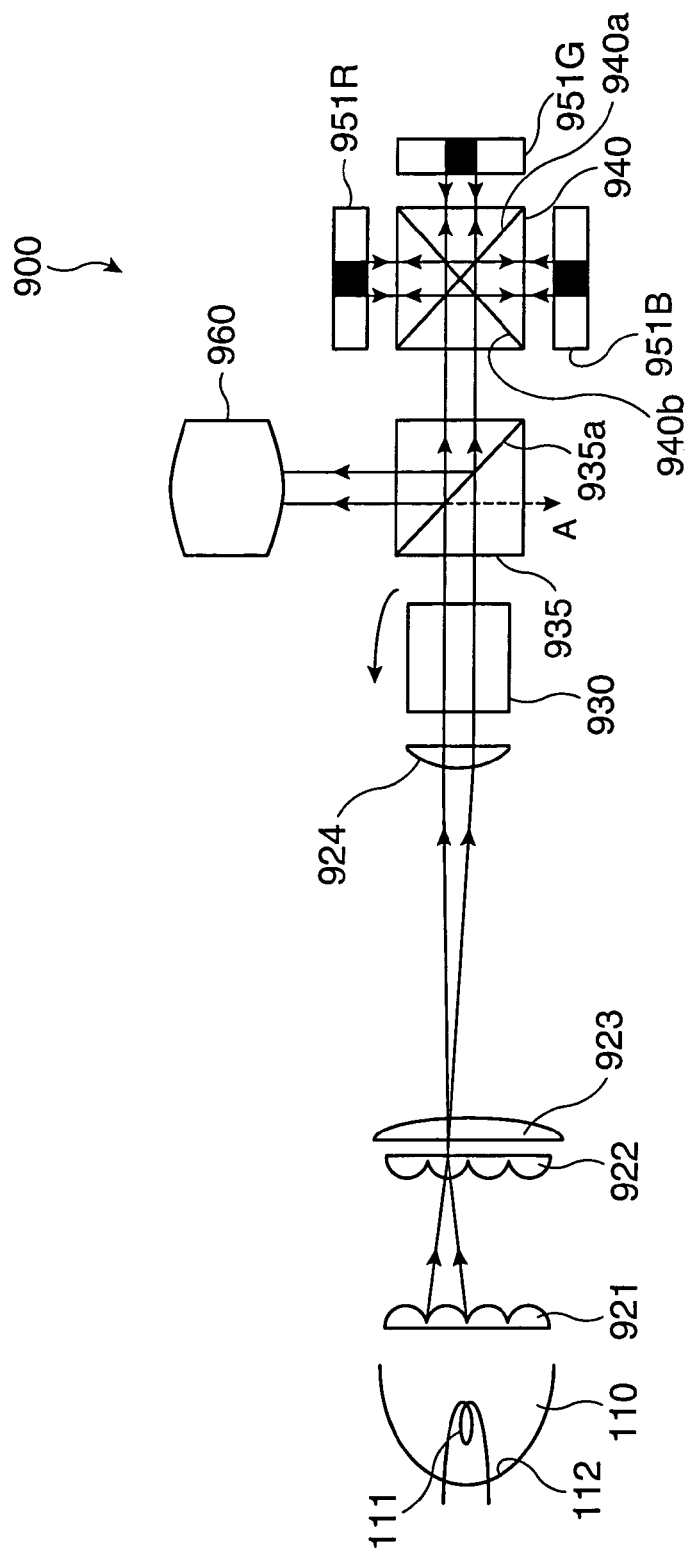
FIG. 23 is a schematic view for illustrating a projector in accordance with a ninth exemplary embodiment of the present invention.

FIG. 23 shows a schematic structure for illustrating a projector 900 in accordance with a ninth exemplary embodiment of the present invention. The illumination light emitted from the light source 110 is incident on a collimating lens 924 by passing through a pair of fly-eye lenses 921 and 922 and a superposing lens 923. The collimating lens 924 emits by changing the incident light beam into a substantially parallel light beam. The fly-eye lenses 921 and 922 and the superposing lens 923 as the irradiation optical system function as an irradiation optical system to irradiate the illumination light having a uniform luminance distribution on a ¼ region of the image-forming areas, in a traverse direction, of the plurality of reflective type of liquid crystal light valves 951R, 951G and 951B having an image-forming area with an aspect ratio of 4:3, i.e., a portion of ¼ of the overall image-forming area.

The illumination light emitted from the collimating lens 924 is incident onto a rotating prism 930. The rotating prism 930 rotates in a direction represented by an arrow shown in the drawing. In accordance with the rotation of the rotating prism 930, the illumination light is emitted from the rotating prism 930 while shifting the optical axis in relation to the rotation angle and the index of the refraction. The illumination light emitted from the rotating prism 930 is incident onto a polarizing prism 935. The polarizing prism 935 is formed in such a way that a polarizing film 935a is approximately 45° with respect to the optical axis of the irradiation optical system. The polarizing film 935a has an optical characteristics, for example, that p polarized component of the illumination light is transmitted therethrough, and s polarized component of the illumination light is reflected therefrom. The reflected s polarized component is discarded as unnecessary light beams, along the direction denoted by arrow A. The illumination light emitted from the polarizing prism 935 is incident onto a cross dichroic prism 940 as a color separation synthesizing optical system.

The cross dichroic prism 940 is provided with a B light reflection dichroic film 940a and an R light reflection dichroic film 940b, each of the dichroic films being inclined at an angle of 45° with respect to an incident optical axis and also arranged in the form of X perpendicular to each other. The B light reflection dichroic film 940a, reflects only a blue light among the illumination light, and transmits a red light and a green light. The R light reflection dichroic film 940b reflects the red light among the illumination light, and transmits the blue light and the green light. By doing so, the illumination light incident to the cross dichroic prism 940, being vertical to the incident optical axis to each other, divides the color of the illumination light into the red light, the green light and the blue light traveling to the opposite directions.

The red light, the green light and the blue light separated in color is incident onto the plurality of the reflective type of liquid crystal light valves 951R, 951G and 951B arranged for each of the colors, respectively. The p polarized lights incident onto each of the liquid crystal light valves 951R, 951G and 951B are modulated for each of the colors based on an image signal, thereby emitting as an s polarized light. The light reflected from each of liquid crystal light valves 951R, 951G and 951B for each of the colors is incident on the cross dichroic prism 940 again. Further, the light synthesized in color at the cross dichroic prism 940 is incident on the polarized light beam splitter 935. Among the image light beams incident to the polarized light beam splitter 935, the s polarized component as a modulated light beam is reflected at the polarizing film 935a in the direction of the projection lens 960. Further, the p polarized component as a non-modulated light beam is discarded in the direction of the light source 110 by transmitting the polarizing film 935a. Further, the projection lens 960 transmits the full color image onto the screen (not shown).

In the exemplary embodiments of the present invention, in relation of the shape of the illumination light and the arrangement between the rotation axis of the rotating prism and the liquid crystal light valves, the illumination light irradiated on a ¼ portion of the image-forming area is scanned along a long side direction of the image-forming area of the liquid crystal light valve. Thus, the illumination light is irradiated while being scanned on the image-forming areas of the plurality of reflective type of liquid crystal light valves 951R, 951G and 951B.

Therefore, since the scanning of the illumination light is performed at a high speed by repeating the scanning of the illumination light on the image-forming areas of the plurality of reflective type of liquid crystal light valves 951R, 951G and 951B, if taking an integration for a certain time period, it can be realized that the illumination light having a uniform luminance distribution in the image-forming area is irradiated. Further, paying attention to a part of the image-forming area, since the illumination light is generated or is not generated periodically, there occurs an effect equal to an intermittent lighting.

Further, in the exemplary embodiments of the present invention, only one rotating prism 930 is utilized. But, the present invention is not limited to this, as stated in the third exemplary embodiment of the present invention, it is preferable that the plurality of rotating prisms 331, 332, 333 and 334 (refer to FIG. 6) be arranged between the fly-eye lenses 921 and 922 corresponding to each of the partial light beams split by the fly eye lens 921. More specifically, as shown in FIG. 6, one rotating prism is placed in the corresponding set, respectively, by making the partial light beams with each of the rotating prisms existing on the same column as a set. By this configuration, the illumination light can be scanned on the image-forming area of the reflective type of liquid crystal light valves 951R, 951G and 951B.

Tenth Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are substantially equal to each other, and then the basic explanation is omitted. In each of the exemplary embodiments of the present invention described above, liquid crystal light valves of a transmission type or a reflective type are utilized, whereas, in the tenth exemplary embodiment, a tilting mirror device is utilized as a spatial light modulator. A digital micro mirror device (manufactured by Texas Instrument INC, hereinafter referring as DMD) is utilized as a representative example for the tilting mirror device.

DMD is different from the liquid crystal panel in a method to display an image. In the DMD, the image is formed by time integrating on or off of the illumination light in a predetermined time, for example, within a time of one frame in the image. Further, the detailed description of the DMD operation is described below. In such DMD, if the light emitting time of the image in the predetermined time (e.g., one frame) is continued or is close to the light emitting time of the image of the following predetermine time (e.g., one frame), similar to the liquid crystal light valve described above, a blur occurs in the moving pictures. In the exemplary embodiment of the present invention, such effect can be decreased.

Figure 24:
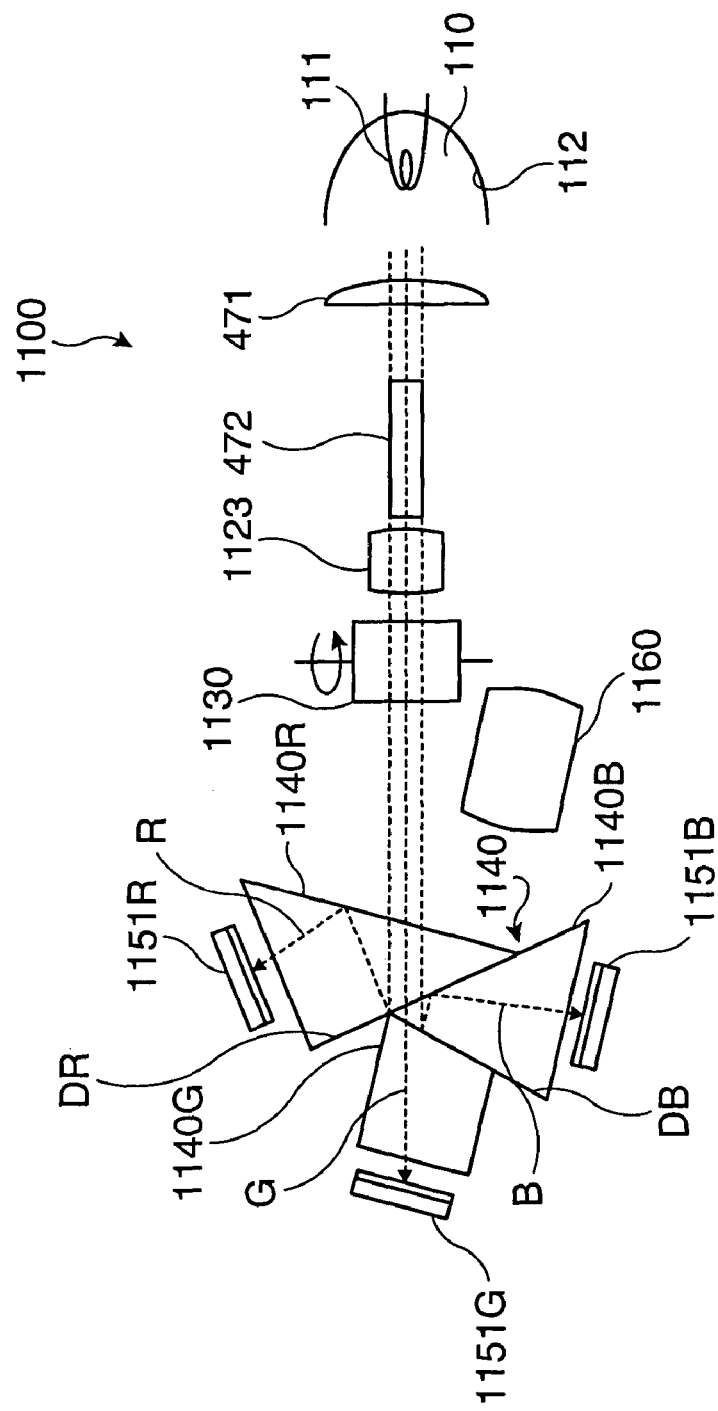
FIG. 24 is a schematic view for illustrating a projector in accordance with a tenth exemplary embodiment of the present invention.
Figure 25:
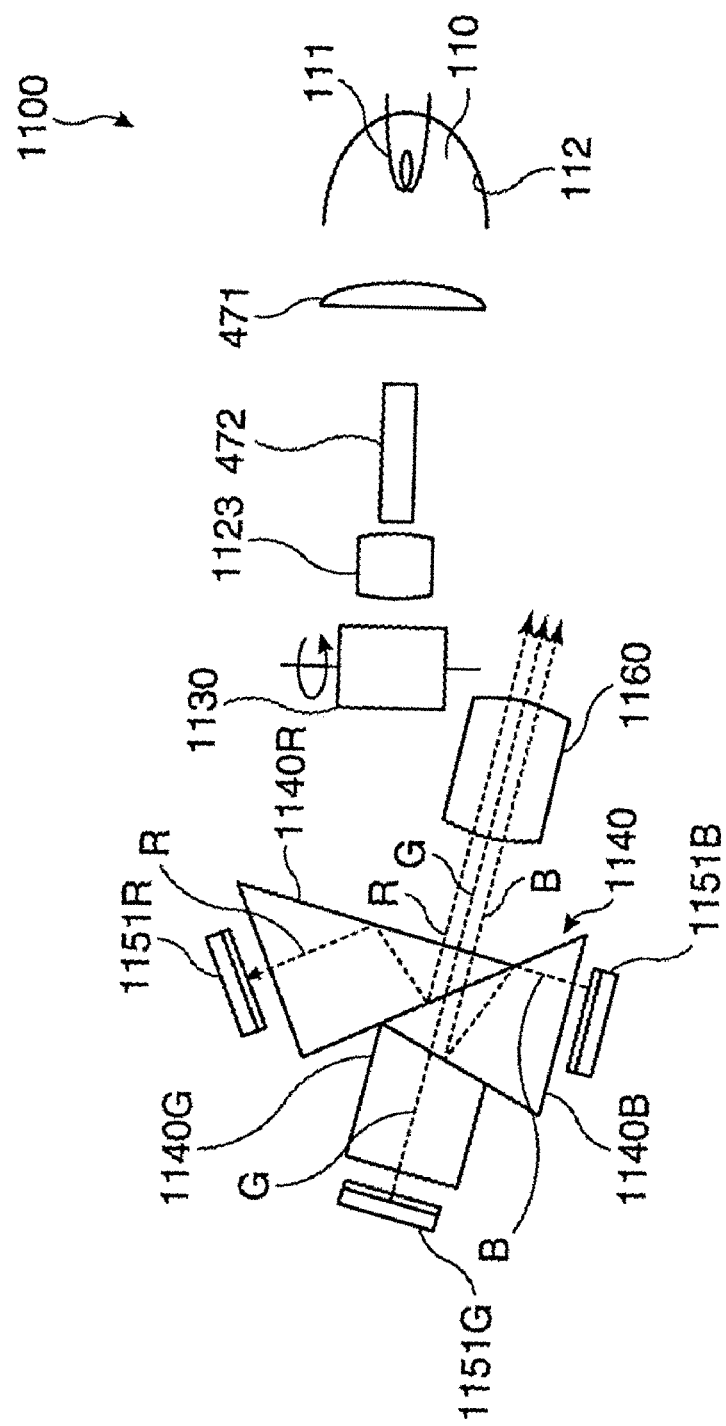
FIG. 25 is another schematic view for illustrating a projector in accordance with a tenth exemplary embodiment of the present invention.

FIGS. 24 and 25 are schematic for illustrating the projector 100 in accordance with the tenth exemplary embodiment of the present invention. FIG. 24 represents the optical path from the light source to the spatial light modulator. Further, FIG. 25 represents the optical path from the spatial light modulator to the projection lens. First, in FIG. 24, the illumination light emitted from the light source 110, by being condensed by a condensing lens 471, is incident onto the incidence end of a rod 472, made of a material such as a glass, in the form of a rectangular column. Further, in the outer wall of the rod 472, the illumination light is emitted at the emission end of the rod 472 while reflecting to the outer wall by utilizing a total reflection condition of the interface. Further, the rod 472 is not limited to the rectangular column shape, a rod of cavity forming the inside surface as a reflective film can be used.

The external shape of the emission end of the rod 472, viewed along the direction of an optical axis, is formed by changing the ratio and the external shape of the image-forming area of the spatial light modulator for forming an image light by modulating the illumination light based on an electrical signal. Further, described hereinafter, the external shapes of the image-forming areas of the plurality of DMDs 1151R, 1151G and 1151B for each of the colors are rectangular shapes having an aspect ratio of 4:3, and the external shape of the emission end of the rod 472 is formed by a rectangular shape having an aspect ratio of 4:1.

Further, the illumination light emitted from the rod 472 transmits through an imaging lens unit 1123 to image the image of the emission end of the rod 472 on the image-forming areas of the plurality of DMDs 1151R, 1151G and 1151B for each of the colors. As a result, the illumination light having a uniform luminance distribution on an area which is smaller than the image-forming area of the plurality of DMDs 1151R, 1151G and 1151B for each of the colors, i.e., a ⅓ portion of the image-forming area can be generated. Here, since the rotating prism 1130 is disposed between the rod 472 and the plurality of DMDs 1151R, 1151G and 1151B for each of the colors as an illumination-light scanning optical system to scan the illumination light on the image-forming areas, the illumination light passes through the rotating prism 1130 while shifting the optical axis in relation to the rotation of the rotating prism 1130 and the index of the refraction. As a result, the illumination light is irradiated by scanning at the image forming region of the plurality of DMDs 1151R, 1151G and 1151B for each of the colors. The illumination light emitted from the rotating prism 1130 is incident onto a color separation/synthesis dichroic prism 1140. Further, in the drawing, the rotating prism 1130 is rotated around an axis parallel to the plane of the paper or perpendicular to the optical axis.

Next, a configuration that the color separation/synthesis dichroic prism 1140 divides the illumination light into the red light, the green light and the blue light is explained. The color separation/synthesis dichroic prism 1140 is configured by combining 3 wedge type prisms 1140R, 1140G and 1140B, each of the prisms being different from each other in shape.

The prism 1140R is a prism in the form of a column having a cross section of a triangular shape. On the plane of the prism 1140R, adjacent to the prism 1140B described hereinafter, an R light reflection dichroic film DR is formed to reflect the red light and to transmit the green light and the blue light. The prism 1140B is also a prism in the form of a column having a triangular cross section. On a plane of the prism 1140B, adjacent to the prism 1140G described hereinafter, a B light reflection dichroic film DB is formed to reflect the blue light and to transmit the green light. The prism 1140G is a prism in the form of a column having a cross section of an approximately trapezoidal shape with one side thereof formed as an inclined side. The plane of the prism 1140G corresponding to the inclined side surface is disposed in contact with the B light reflection dichroic film DB of the prism 1140B. Further, the prism 1140B is arranged in such a way that a very small gap between the prism and the prism 1140R is maintained.

The color separation/synthesis dichroic prism 1140 described above separates the illumination light into the red light, the green light and the blue light. In the neighboring portion of the emission surface for each of the colors at the color separation/synthesis dichroic prism 1140, the plurality of DMDs 1151R, 1151G and 1151B are arranged as a spatial light modulator. In the image-forming areas for each of the DMDs 1151R, 11151G and 1151B, a plurality of tilting mirror devices are disposed. The tilting mirror device is provided with a moving mirror unit for alternatively selecting a first reflection position and a second reflection position. Further, for example, when the moving mirror unit is placed at the first reflection position (ON), the incident light is reflected to the direction of the projection lens 1160. On the other hand, when the moving mirror unit is placed at the second reflection position (OFF), the incident light is discarded by reflecting in the directions different from the direction of the projection lens 1160.

FIG. 25 represents an optical path when the image light modulated by each of the DMDs 1151R, 1151G and 1151B in response to the image signal is incident on the projection lens 1160. Each of the color lights modulated by the DMDs 1151R, 1151G and 1151B is color synthesized at the color separation/synthesis dichroic prism 1140. Further, as described above, the image light modulated in response to the image signal is projected on a screen (not shown) by the projection lens 1160.

Like this exemplary embodiment, in case the DMD is utilized as a spatial light modulator, in relation of the shape of illumination light and the arrangement between the rotation axis of the rotating prism and the DMD, the illumination light irradiated on a portion, for example, a ⅓ portion, of the image-forming area is scanned on the image-forming area of the DMD along a short side direction. Like this, the illumination light is irradiated while being scanned on the image-forming areas of each of the DMDs 1151R, 1151G and 1151B.

Therefore, by being processed at a high speed by repeating the scanning of the illumination light onto the image-forming areas of each of the DMDs 1151R, 1151G and 1151B, if taking an integration for a predetermined time period, it is possible that the illumination light having a uniform luminance distribution at the image-forming area is irradiated. Further, paying attention to a portion of the image-forming area, since the illumination light is generated or is not generated periodically, there occurs an effect equal to an intermittent lighting.

Eleventh Exemplary Embodiment

In the exemplary embodiment of the present invention described hereinafter, the like reference numeral represents the same element as described in the previous exemplary embodiments and the common descriptions for the operation and the function are omitted. Further, in the case of using the similar term, although the reference numerals are different, the functions thereof are substantially equal to each other, and then the basic explanation is omitted.

Figure 26:
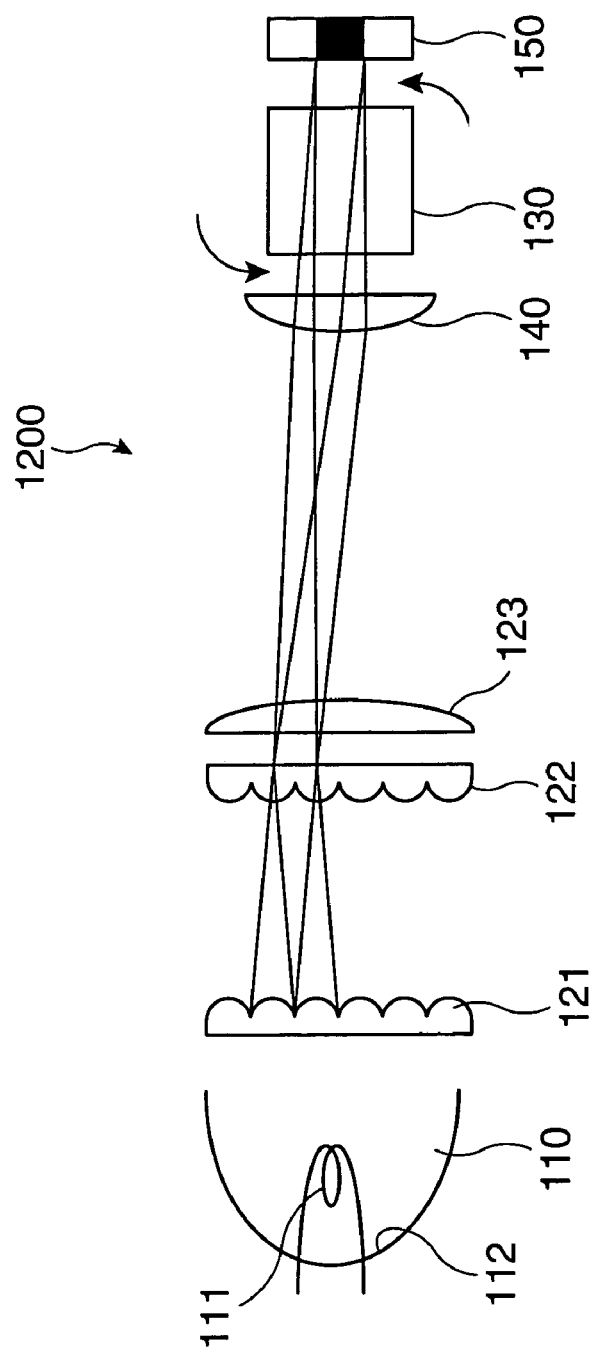
FIG. 26 is a schematic view for illustrating an image display device in accordance with an eleventh exemplary embodiment of the present invention.

FIG. 26 illustrates a schematic construction of an image display device 1200 in accordance with an eleventh exemplary embodiment of the present invention. The image display device 1200 is different from the projector 100 in accordance with the first exemplary embodiment of the present invention in that the image display device does not include a projection lens 160. The illumination light emitted from the light source 110 is incident onto the collimating lens 140 after passing through the fly-eye lenses 121 and 122 and the superposing lens 123. The collimating lens 140 emits by converting the incident light into a substantially parallel light. The fly-eye lenses 121 and 122 and the superposing lens 123 as an irradiation optical system function as an irradiation optical system to irradiate the illumination light having a uniform luminance distribution on a ⅓ region of the image-forming areas in a longitudinal direction of the transmission type of liquid crystal light valve 150 having an image-forming area with an aspect ratio of 4:3, i.e., a portion of ⅓ of the overall image-forming area.

The illumination light emitted from the collimating lens 140 is incident to the rotating prism 130. The rotating prism 130 rotates in accordance with the direction represented by an arrow in the drawings. The illumination light is emitted from the rotating prism 130 in relation of the rotation angle and the index of the refraction in accordance with the rotation of the rotating prism 130 while shifting the optical axis. The illumination light emitted from the rotating prism 130 is incident onto the liquid crystal light valve 150.

Therefore, by implementing the scanning at a high speed by repeating the scanning of the illumination light onto the image-forming area of the liquid crystal light valve 150, if taking an integration for a predetermined time period, it is possible that the illumination light having a uniform luminance distribution at the image-forming area is irradiated as shown in (e) of FIG. 3 as described above. Further, paying attention to a part of the image-forming area, since the illumination light is generated or is not generated periodically, there occurs an effect equal to an intermittent lighting.

Referring back to FIG. 26, as explained above in FIG. 3, the illumination light incident to the image-forming area of the liquid crystal light valve 150 is emitted to a viewer side (not shown) by being modulated in the image-forming area of the liquid crystal light valve 150 based on an electrical signal. By doing so, the viewer can directly watch the image.

Further, in this exemplary embodiment, only one rotating prism 130 is utilized. However, the present invention is not limited to this, but, as stated in the third exemplary embodiment, the plurality of rotating prisms 331, 332, 333 and 334 (refer to FIG. 6) may be arranged between the fly-eye lenses 121 and 122 corresponding to each of the partial light beams split by the fly eye lens 121. More specifically, as shown in FIG. 6, each rotating prism is placed in the corresponding set, by making the partial light beams with each of the rotating prisms existing on the same column as a set. By this configuration, the illumination light can be scanned on the image-forming area of the liquid crystal light valve 150.

Further, the irradiation optical system, is not limited to the fly-eye lenses 121 and 122 and the superposing lens 123, however, for example, the combination (refer to FIG. 7) of the condensing lens, the rod and the imaging lens described in the fourth exemplary embodiment of the present invention may be employed as the irradiation optical system. Further, the position of the collimating lens 140 can be changed in any position in the optical path by the design. Further, in the optical path between the rotating prism 130 and the liquid crystal light valve 150, it may be possible that the lens system to increase or decrease the cross section of the illumination light or an optical device such as a reflective mirror for changing the direction of the illumination light is prepared.

Finally, in the lens array, the superposing lens, the rod, the imaging lens, the rotating prism, the liquid crystal light valve, the DMD, the image-inverting prism or the like represented in the exemplary embodiments of the present invention, the arrangement, the shapes, the form, and the size thereof or the like are not limited to applying the optical systems of the projectors utilized in each of the exemplary embodiments, but it is possible that those are applied to the other optical system without departing from the major sprit and scope of the present invention. For example, in the present invention, in case where a liquid crystal light valve is utilized as a spatial light modulator, the present invention may be combined with an optical device, disclosed in Japanese Unexamined Patent Application Publication No. 8-304739, for unifying the polarizations of the light, thereby improving the utilization efficiency of the light.

Further, the irradiation optical system and the illumination-light scanning optical system are not limited to the lens array, the superposing lens, the rod, the imaging lens, and the rotating prisms as described in the aforementioned embodiments, but the various changes and modifications of the present invention may be made without departing from the spirit and scope of the present invention defined. For example, a polygon mirror for scanning the light beam by rotating the polyhedron configuring the surfaces thereof as a reflection surface or an optical element for scanning the light by electrically controlling the orientation of the liquid crystal molecular may be employed as the illumination-light scanning optical system.

Further, the region, the shape and the scanning direction of the illumination light irradiated on the image-forming areas of the liquid crystal light valve or the DMD are not limited to the configurations represented in each of the exemplary embodiments, but the various changes and modifications of the present invention may be made without departing from the spirit and scope of the present invention.

As stated above, in the projector and the image display device of the present invention, in the momentary time, although the irradiation of the illumination light is performed only a part of the image-forming area of the space light modulator by the irradiation optical system, in the range of a certain time, since the illumination light can be scanned on the image-forming area by the illumination-light scanning optical system, the irradiation of the illumination light having a uniform luminance distribution over the overall image-forming area can be realized. As a result, in case where the image is projected onto the screen, the viewer can recognize the image by his eyes.

Further, paying attention to the portion of the image-forming area, since the illumination light is illuminated or is not illuminated periodically, there occurs an effect equal to an intermittent lighting. As a result, even if the spatial light modulator is a hold type, the present invention can display a clear moving picture.

ADVANTAGES

Further, the present invention is capable of displaying an image without becoming dark in comparison with the related art device, since the amount of the light is also not changed from that of the related art device when an amount of the light equal to that of the related art projector and the image display device is illuminated from the light source.

Therefore, by enhancing the display performance of moving pictures, the present invention can provide a projector and an image display device having a bright light or a good utilization efficiency of the light.

Specifically, the present invention can obtain a very high effect for the projector and the image display device by utilizing a liquid crystal light valve, which is one of the hold-type displays.

The invention claimed is:

1. A projector, comprising:
a light source to emit illumination light;
a color separation optical system to split the illumination light into illumination light with at least two colors;
a plurality of spatial light modulators having an image-forming area to form image light by modulating the illumination light based on an electrical signal;
a color synthesizing optical system to synthesize the image light formed by the plurality of spatial light modulators;
a projection device to project an image light synthesized by the color synthesizing optical system;
an irradiation optical system to irradiate the illumination light onto a region which is smaller than the image-forming area by converting at least one of a shape and a size of a light beam of the illumination light emitted from the light source; and
an illumination-light scanning optical system to scan the illumination light emitted by the irradiation optical system on the image-forming area,
a respective one of the plurality of spatial light modulators being disposed for each of the colors.

2. The projector according to claim 1, the color separation optical system being provided to split the illumination light scanned by the illumination-light scanning optical system into illumination light with at least two colors.

3. The projector according to claim 1, further comprising:
a relay imaging device disposed in an optical path of the illumination light and having a larger optical path than the other illumination light among the illumination light separated in color by the color separation optical system, the relay imaging device transmitting the image before the incidence and the image after the emission in the same direction.

4. The projector according to claim 1, further comprising:
an image-inverting prism being disposed so as to invert the scanning direction of the image for at least one color of separated illumination light.

5. The projector according to claim 1,
the illumination-light scanning optical system being disposed for each of the colors.

6. The projector according to claim 5,
the illumination-light scanning optical system for each of the colors being provided with at least one rotating prism to change the refractive angle of the illumination light, while rotating, to thus scan the illumination light, and at least one rotating prism rotates in a direction different to the rotation directions of the other rotating prisms.

7. The projector according to claim 1, the illumination-light scanning optical system being provided with a rotating prism to change the refractive angle of the illumination light, while rotating, to thus scan the illumination light.

8. The projector according to claim 1, the irradiation optical system including a lens array member to split the illumination light into a plurality of partial light beams to condense each of the divided partial light beams and a superposing lens unit to superpose the divided partial light beams on the image-forming area or a conjugate plane with respect to the image-forming area.

9. The projector according to claim 8, the illumination-light scanning optical system being provided with a rotating prism to change the refractive angle of the illumination light, while rotating, to thus scan the illumination light, and the rotating prism being disposed between the superposing lens unit and the spatial light modulator.

10. The projector according to claim 8, the illumination-light scanning optical system being provided with a plurality of rotating prisms to change the refractive angle of the illumination light, while rotating, to thus scan the illumination light, and a plurality of the rotating prisms are arranged according to the partial light beams split by the lens array member.

11. The projector according to claim 1, the irradiation optical system being provided with a rod part to reflect the illumination light inputted from an incident end on an inside wall or an outside wall to emit the reflected illumination light at an emission end, and an imaging lens unit to form an image of the emission end on the image-forming area.

12. The projector according to claim 11, the illumination-light scanning optical system being provided with a rotating prism to change the refractive angle of the illumination light, while rotating, to thus scan the illumination light, and the prism being disposed between the rod part and the spatial light modulator.

13. The projector according to claim 1, the projector being structured so that each of colors is overlapped in the image light projected by the projection device.

14. The projector according to claim 1, the projector being structured so that each of colors are substantially the same size in the illumination light irradiated by the irradiation optical system onto the image-forming area.

15. The projector according to claim 1, the projector being structured so as to suppress an effect due to a difference of lengths between optical path of each of the colors.

* * * * *